(12) United States Patent
Kalia et al.

(10) Patent No.: US 12,388,748 B2
(45) Date of Patent: Aug. 12, 2025

(54) CREATING ELASTICITY AND RESILIENCY IN VIRTUALIZED RANS

(71) Applicant: Microsoft Technology Licensing, LLC, Redmond, WA (US)

(72) Inventors: Anuj Kalia, Newcastle, WA (US); Daehyeok Kim, Redmond, WA (US); Ilias Marinos, London (GB); Tao Ji, Austin, TX (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 638 days.

(21) Appl. No.: 17/825,543

(22) Filed: May 26, 2022

(65) Prior Publication Data

US 2023/0412502 A1    Dec. 21, 2023

(51) Int. Cl.
*H04W 4/00* (2018.01)
*H04L 45/00* (2022.01)
*H04L 45/28* (2022.01)
*H04W 72/21* (2023.01)
*H04W 72/29* (2023.01)

(52) U.S. Cl.
CPC .............. *H04L 45/66* (2013.01); *H04L 45/28* (2013.01); *H04W 72/21* (2023.01); *H04W 72/29* (2023.01)

(58) Field of Classification Search
None
See application file for complete search history.

(56) References Cited

U.S. PATENT DOCUMENTS

| | | | |
|---|---|---|---|
| 2018/0248787 A1* | 8/2018 | Rajagopal | H04W 72/543 |
| 2019/0254047 A1* | 8/2019 | Ahmed | H04W 88/085 |
| 2019/0289497 A1* | 9/2019 | Rajagopal | H04B 7/0456 |
| 2020/0267576 A1* | 8/2020 | Bedekar | G06F 9/5077 |
| 2022/0232423 A1* | 7/2022 | Thyagaturu | H04W 28/10 |
| 2024/0089781 A1* | 3/2024 | Gemelli | H04W 24/02 |

FOREIGN PATENT DOCUMENTS

CN    106714184 A    5/2017

OTHER PUBLICATIONS

Chantre, et al., "Reliable Broadcasting in 5G NFV-Based Networks", In Journal of IEEE Communications Magazine, vol. 56, Issue 3, Mar. 15, 2018, pp. 218-224.
"International Search Report and Written Opinion Issued in PCT Application No. PCT/US23/014409", Mailed Date: Jun. 2, 2023, 13 Pages.

* cited by examiner

*Primary Examiner* — Bob A Phunkulh

(57) ABSTRACT

Methods and systems for dynamically re-routing layer traffic between different servers with little user-visible disruption and without modifications to the vRAN software stack are provided. For instance, transformations on messages between the L2 and PHY, such as duplication and filtering, enable the system to maintain one or more low-overhead "hot, inactive" PHY clones. A hot, inactive PHY clone may be a duplicate of an operational PHY, where the PHY clone is primed to process a PHY workload of the operational PHY (e.g., "hot") but is not currently responsible for processing the PHY workload (e.g., low-overhead, inactive). In this way, a PHY workload may be automatically and seamlessly migrated to the hot PHY clone in response to planned downtime (e.g., scheduled maintenance, software upgrades)

(Continued)

or unexpected events (e.g., server failures) within the strict transmission time intervals (TTIs) required for processing the PHY workload.

20 Claims, 12 Drawing Sheets

CREATING ELASTICITY AND RESILIENCY IN VIRTUALIZED RANS

BACKGROUND

Radio access networks (RANs) are a part of the cellular network infrastructure (e.g., LTE and 5G) that convert wireless signals between user equipment and radio cell towers into data packets and vice versa. Manufacturers and providers of RANs are seeking to replace specialized RAN hardware with software systems running on commodity servers deployed in edge datacenters. This approach, called virtualized RAN (vRAN), has advantages of reduced vendor lock-ins, rapid feature development/upgrades, easier maintenance, and reduced costs. However, current vRAN deployments need to overcome challenges in high availability, energy efficiency, servicing, and/or load balancing.

Distributed unit (DU) servers, which run lower layers of a vRAN stack, are statically configured to serve a fixed set of radio units (RUs). These lower layers include the physical layer (PHY, layer-1, or L1) and layer-2 (L2), consisting of the RAN Media Access Control (MAC) and Radio Link Control (RLC) layers. While such static configuration works well for certain scenarios (e.g., no server failures, no workload changes, etc.), there are cases where needs exist to dynamically reconfigure the RU-to-server mapping, achieved by dynamically migrating the DU processing to a different server. For example, when a PHY process fails, the signal processing workload served by the failed PHY process needs to be migrated to another server. This functionality is not available in current vRAN deployments.

Two aspects that make migrating the DU layers challenging are real-time latency requirements and high software complexity. First, DU processing has stringent tail latency requirements by requiring signal processing tasks to be completed within strict transmission time intervals (TTIs) that can measure as low as 500 μs in 5G's common deployment configurations. As a result, existing approaches (e.g., virtual machine migration) are inapplicable since they require between tens of milliseconds to seconds to complete the migration. Such downtime in PHY processing can cause severe user-visible disruptions. Second, production-grade vRAN software stacks are complex and often proprietary, which makes them difficult or almost impossible to modify to implement any custom migration logic.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by dynamically re-routing layer traffic between different servers with little user-visible disruptions and without modifications to the vRAN software stack. For instance, transformations on messages between the L2 and PHY, such as duplication and filtering, enable the system to maintain one or more low-overhead "hot, inactive" PHY clones. In aspects, a hot, inactive PHY clone may be a duplicate of an operational PHY, where the PHY clone is primed to process a PHY workload of the operational PHY (e.g., "hot" or "alive") but is not currently responsible for processing the PHY workload (e.g., low-overhead, inactive). In this way, a PHY workload may be automatically and seamlessly migrated to the hot PHY clone in response to planned downtime (e.g., scheduled maintenance, software upgrades) or unexpected events (e.g., server failures) within the strict transmission time intervals (TTIs) required for processing the PHY workload.

In an aspect, a server system is provided. The server system including a first message controller associated with a first layer two (L2) of a first Radio Access Network (RAN) server and memory storing instructions that, when executed by a processor, cause the first message controller to perform operations. The operations including intercepting, from the first L2 of the first RAN server, a first request directed to a first layer one (PHY) of the first RAN server, where the first request includes first information for performing signal processing of one or more first radio unit (RU) signals of a radio unit (RU). Additionally, the operations include duplicating the first request, where duplicating the first request comprises removing the first information to form a first null request. The operations further include routing the first request including the first information to the first PHY of the first RAN server, where the first PHY is active and performs the signal processing on the one or more first RU signals of the RU based on the first information, and routing the first null request not including the first information to a second layer one (PHY) of the second RAN server, where the second PHY is alive based on receiving the first null request and inactive based on the first null request not including the first information.

In another aspect, a method of migrating signal processing from a first layer two (L2) of a first radio access network (RAN) server to a second layer one (PHY) of a second RAN server is provided. The method includes intercepting, from the first L2 of the first RAN server, a request directed to a first PHY of the first RAN server, where the request includes instructions for performing signal processing of one or more radio unit (RU) signals of a radio unit (RU). Additionally, the method includes determining the second RAN server should perform the signal processing on the one or more RU signals of the RU and duplicating the request, where duplicating the request comprises removing the instructions to form a null request. The method further includes routing the request including the instructions to the second PHY of the second RAN server, where the second PHY is active and performs the signal processing on the one or more RU signals of the RU based on the instructions, and routing the null request not including the instructions to the first PHY of the first RAN server, where the first PHY is alive based on receiving the null request, and where the first PHY is inactive based on the null request not including the instructions.

In yet another aspect, a method of migrating signal processing from a first layer two (L2) of a first radio access network (RAN) server to a second layer one (PHY) of a second RAN server is provided. The method includes intercepting, from the first L2 of the first RAN server, a femtocell application programming interface (FAPI) request directed to a first PHY of the first RAN server, where the FAPI request includes information for performing signal processing on one or more radio unit (RU) signals of an RU. Additionally, the method includes determining the second RAN server should perform the signal processing on the one or more RU signals of the RU and duplicating the FAPI request, where duplicating the FAPI request comprises removing the information to form a null FAPI request. The method further includes routing the FAPI request including the information to the second PHY of the second RAN server, where the second PHY is active and performs the signal processing on the one or more RU signals of the RU based on the information, and routing the null FAPI request not including the information to the first PHY of the first RAN server, where the first PHY is alive based on receiving the null FAPI request, and where the first PHY is inactive based on the null FAPI request not including the information.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
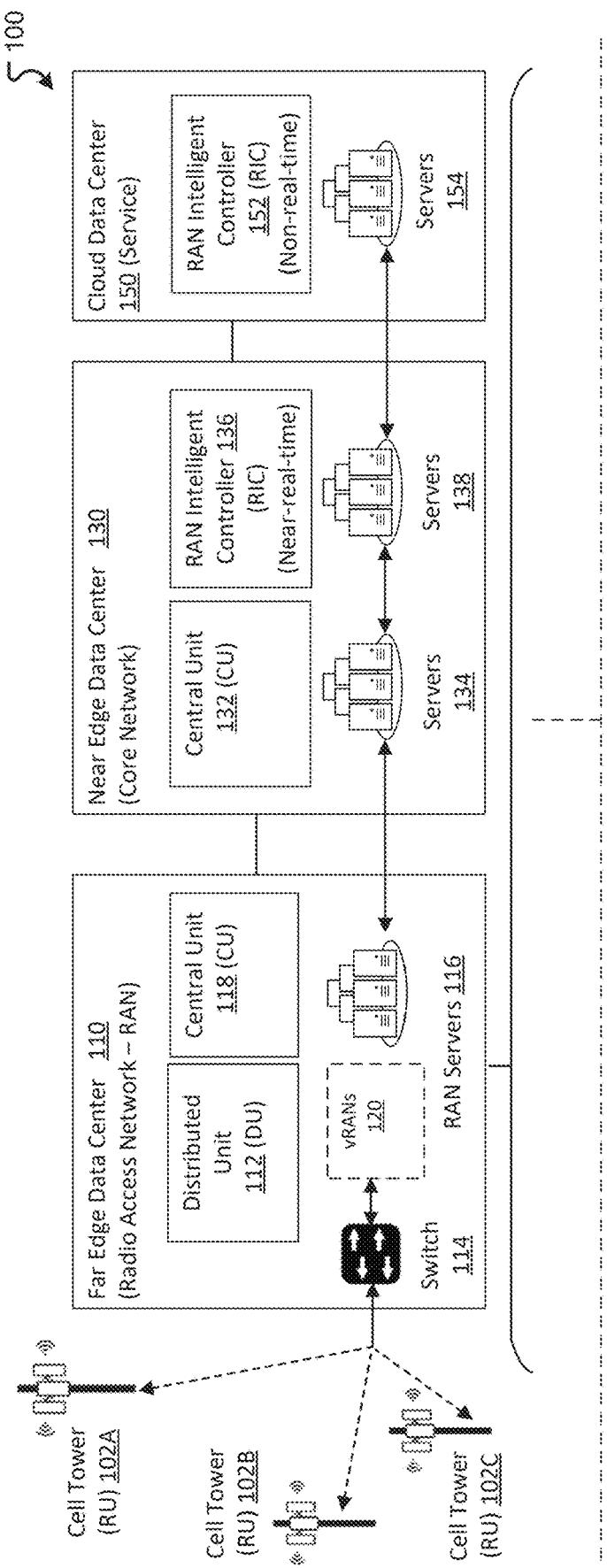
FIG. 1 illustrates an overview of an example system implementing a cloud RAN, in accordance with aspects of the present disclosure.
Figure 1:
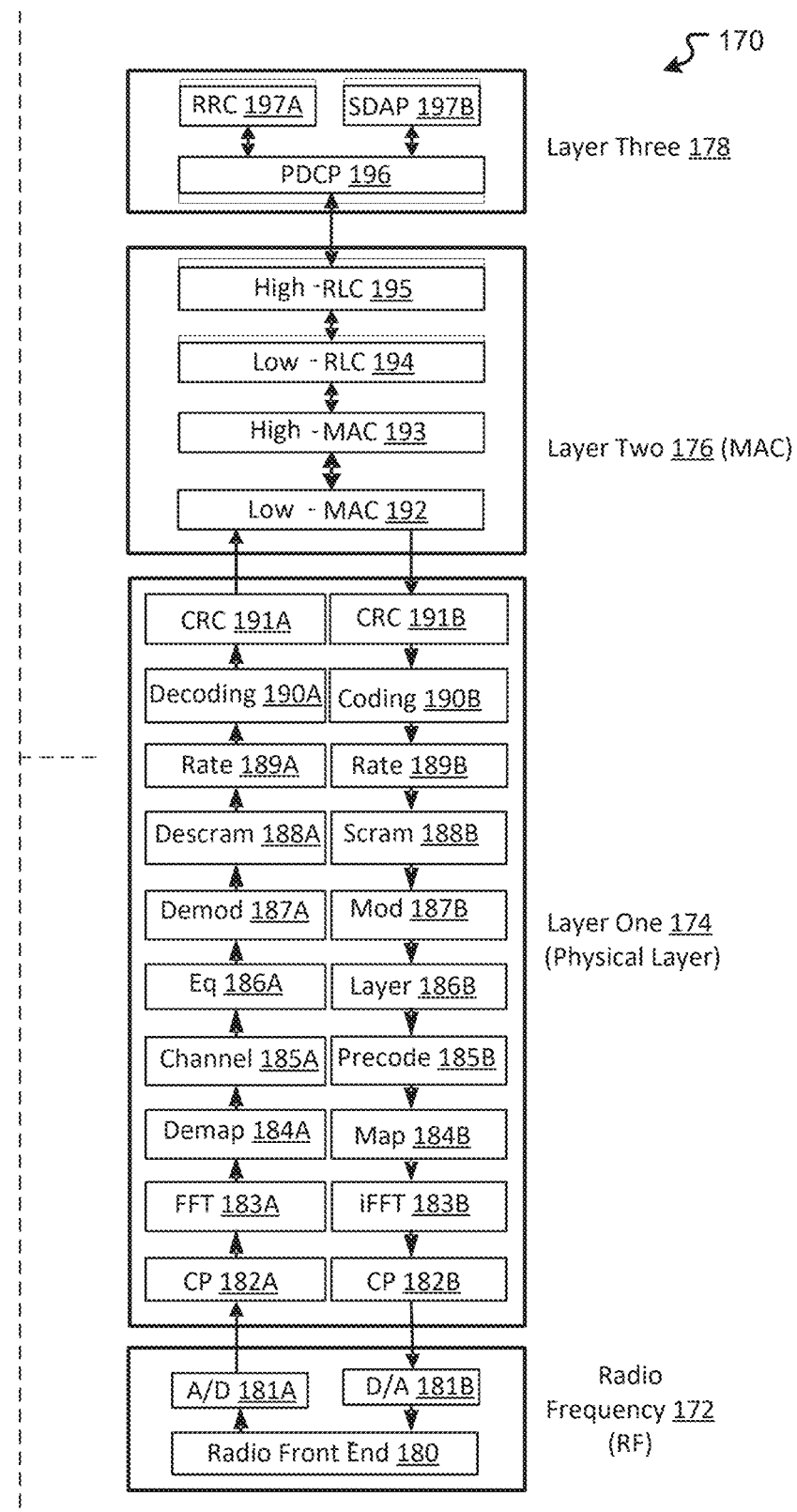

Various aspects of the disclosure are described more fully below with reference to the accompanying drawings, which form a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

According to the present disclosure, the above and other issues are resolved by dynamically re-routing layer traffic between different servers with little user-visible disruptions and without modifications to the vRAN software stack. For instance, transformations on messages between the L2 and PHY, such as duplication and filtering, enable the system to maintain one or more low-overhead "hot, inactive" PHY clones. In aspects, a hot, inactive PHY clone may be a duplicate of an operational PHY, where the PHY clone is primed to process a PHY workload of the operational PHY (e.g., "hot" or "alive") but is not currently responsible for processing the PHY workload (e.g., low-overhead, inactive). In this way, a PHY workload may be automatically and seamlessly migrated to the hot PHY clone in response to planned downtime (e.g., scheduled maintenance, software upgrades) or unexpected events (e.g., server failures) within the strict transmission time intervals (TTIs) required for processing the PHY workload.

As described further herein, the described approach discards the PHY's internal computation state during migration. Doing so has little to no effect on user connectivity, since PHY processing in cellular networks maintains little inter-TTI (or inter-slot) state. However, in cases where state must be migrated, an external state store may be used. Based on the minimal inter-slot state for the PHY processing, layer traffic such as the PHY-L2 traffic (e.g., traffic from PHY to L2) or L2-PHY traffic (e.g., traffic from L2 to PHY) can simply be re-routed to a different server. This re-routing mechanism is realized by interposing one or more message controllers (e.g., middlebox) in a communication channel (e.g., a shared-memory communication channel, a network channel, or the like) between the PHY and L2. Layer traffic includes messages exchanged between the PHY and L2 in the communication channel. The messages between the PHY and L2 are intercepted by the one or more message controllers and re-routed between servers via the edge datacenter's Ethernet network, using a protocol such as User Datagram Protocol (UDP), Remote Direct Memory Access (RDMA), etc. In some cases, the messages are obtained from the communication channel and converted into one or more network packets (e.g., by adding packet headers). The one or more network packets encapsulating the messages are then transmitted over the edge datacenter's network to the appropriate server. In other cases, the communication channel may be a network channel and the intercepted messages may be nFAPI message sent over SCTP/UDP, or some other network protocol. As with messages intercepted in a shared-memory channel, network messages may be similarly intercepted and re-routed according to the present disclosure. In this regard, the dynamic re-routing of the PHY-L2 (or L2-PHY) traffic becomes transparent to existing vRAN software and hardware components.

In addition to dynamic re-routing meeting the strict TTIs (e.g., during failures) and being compatible with the existing vRAN infrastructure (which may be based on proprietary hardware and/or software), the present disclosure promotes energy efficiency by enabling bin-packing. As described above, RAN datacenters often have low-energy efficiency due to the large variations in RAN traffic. For example, there may be significant spikes in traffic at different times of the day (e.g., during morning or evening rush-hours, due to a concert or sporting event, or the like). Moreover, there may be significant variations in UE traffic between daytime and nighttime hours. Currently, datacenters a configured with enough resources to meet high demand, with little or no ability to load balance during such high demand periods. Nor are current datacenters able to quickly consolidate RAN processing onto fewer vRANs during low demand, leaving many vRANs idle or operating at low capacity. This is both a waste of resources, which could be used for other non-RAN processing tasks, and a waste of energy, which is still required to power RAN servers hosting the vRANs in an idle or low-capacity state. By dynamically re-routing traffic, the present systems are able to take advantage of the high-low traffic fluctuations of the RAN to reduce energy consumption. For example, with PHY migration (discussed further below), vRAN operators can increase energy efficiency by "bin-packing" the PHY processing of the radios onto the fewest number of servers based on current workload. The remaining idle servers may then be placed in a power-saving or power-off state.

FIG. 1 illustrates an overview of an example system 100 in which dynamic re-routing of layer traffic may be implemented. A mobile wireless telecommunication network, such as the system 100, may use a cloud service for implementing a RAN. In this case, the cloud service connects cell towers, with which mobile devices (e.g., user equipment, UE) connect, to the public network (e.g., the Internet), telecommunication networks, private networks, or other suitable networks. The cloud service provides virtual servers and other computing resources for dynamically scaling the computing capacity as needed based on the volume of data traffic (e.g., to and from the mobile devices). In aspects, a cloud RAN infrastructure represents an implementation of cloud services for the RAN. In contrast to a typical cloud service, the cloud RAN infrastructure may include geographical and physical constraints as well as latency constraints imposed by RAN standards. The cloud RAN infrastructure provides communication connections between at least one cell tower associated with an RU and cloud servers associated with one or more of a distributed unit (DU), a central unit (CU), and a RAN intelligent controller (RIC). The cell tower is in the field, where mobile devices connect over wireless cellular communications, and the RU of the cell tower connects to a DU of a vRAN hosted by a RAN server at a far-edge datacenter. To enable real-time processing of RAN data traffic, the far-edge datacenter may be relatively close (e.g., a few kilometers) to the cell tower.

As noted above, the DU is associated with network switches and processes data in a series of operations associated with at least layer one (physical layer, L1) and layer two (data link layer, L2) of the Open Systems Interconnection (OSI) model. The physical layer connects a data link layer device (e.g., medium access control (MAC) device) to a physical medium (e.g., optical fiber, copper cable, etc.). In aspects, a switch is a hardware device that connects devices on a digital network by using packet switching to receive and forward data to a destination device. Packet switching involves grouping the transmitted data into "packets." A "header" of each packet includes a "MAC address," which is a unique identifier used to direct the packet in the data link layer to a destination device. A "payload" of each packet includes the transmitted data, which is ultimately extracted and used by application software. Some switches include integrated circuit chips programed to process packets according to fixed rules associated with a limited set of networking protocols. Other switches are programmable based on a protocol independent switch architecture which enables developers to program each stage of packet processing.

In the example embodiment shown in FIG. 1, cell towers 102A-C transmit and receive wireless communications with mobile computing devices (e.g., UE) over a RAN. The example system 100 further includes a far-edge datacenter 110 (switches, RAN servers, vRANs), a near-edge datacenter 130 (core network servers), and a cloud datacenter 150 (cloud services). In aspects, the example system 100 corresponds to a cloud RAN infrastructure for a mobile wireless telecommunication network.

The far-edge datacenter 110 includes a DU 112 and a CU 118. In aspects, the far-edge datacenter 110 enables cloud integration with a RAN. The far-edge datacenter 110 includes a switch 114 and RAN servers 116 configured to host vRANs 120 (or vRAN instances 120) for processing RAN data. A vRAN is a type of RAN in which networking functions (including the control and data planes) are separated from the hardware that hosts the vRAN (e.g., RAN servers 116 hosting the vRANs 120). In general, network function virtualization involves enabling software to perform hardware-based functions. This leads to increased responsiveness to network fluctuations and increased flexibility for enhancement since software can be upgraded or repaired more easily than hardware. In aspects, a vRAN environment may be based on an INTEL® FlexRAN implementation.

The switch 114 and RAN servers 116 process incoming data traffic and outgoing data traffic associated with a layer one (physical layer, PHY) 174 and at least a part of layer two (L2) 176, including the MAC layer and the RLC. In aspects, the far-edge datacenter 110 is at a remote site from the cloud datacenters associated with the core network and cloud services. For example, the remote site may be located within a few kilometers or more of the cell towers 102A-C. In aspects, the upstream data traffic corresponds to data flowing from the cell towers 102A-C to servers 154 in the cloud datacenter 150. Similarly, the downstream data traffic corresponds to data flowing from the cloud datacenter 150 to the cell towers 102A-C.

The near-edge datacenter 130 (e.g., hosting the core network) includes a CU 132 and a RAN intelligent controller 136 (RIC). The CU 132 is associated with servers 134 and the RIC 136 is associated with servers 138. In some aspects, the RIC 136 may perform near real-time processing. In aspects, the near-edge datacenter 130 is at a regional site of a private cloud service. For example, the regional site may be located tens of kilometers from the cell towers 102A-C.

The cloud datacenter 150 includes a RIC 152 associated with the servers 154. For example, the RIC 152 processes non-real-time service operations. In aspects, the cloud datacenter 150 may be at a central location in the cloud RAN infrastructure. For example, the central locations may be located hundreds of kilometers from the cell towers 102A-C. In aspects, the far-edge datacenter 110, which is closer to the cell towers 102A-C than the cloud datacenter 150, provides signal processing within the stringent RAN TTIs (e.g., 500 µs) required by RAN standards. In contrast, the cloud datacenter 150, which is furthest from the cell towers 102A-C in the cloud RAN infrastructure, may provide processing in a non-real-time manner.

Operational partitions 170 illustrate various operational segments for processing data traffic in the RAN. For example, operational partitions 182-191 may correspond to the layer one 174 processing and operational partitions 192-195 may correspond to the layer two 176 processing of the OSI seven-layer model.

In aspects, conversion of data associated with a radio frequency (RF) 172 occurs prior to processing data at the layer one 174. For data processing of the RF 172, the radio front-end partition receives and sends data through the cell towers 102A-C to mobile computing devices over wireless communications. An analog to digital converter (A/D) 181A converts analog data from the radio front-end to digital data for the upstream data traffic. A digital to analog converter (D/A) 181B converts digital data into analog data for the downstream data traffic. In aspects, the interface between the DU and RU in a cloud RAN is referred to as "fronthaul." The fronthaul defines various "planes" of operations including the "c-plane" (control plane), "u-plane" (user plane), "s-plane" (synchronization plane), and "m-plane" (management plane). In general, c-plane data is directed to scheduling and coordination of data transmission, u-plane data is directed to efficient data transfer, s-plane data is directed to timing and synchronization of data transmission between the RU and DU, and m-plane data relates to managing the RU. Packets having data payloads related to the different planes of operation include corresponding header information (e.g., a "c-plane header," "u-plane header," etc.).

Partitions in the layer one 174 are related to operations for converting coded symbols associated with a bit stream into a physical signal for transmission using communication media (e.g., a physical wire or radio). For example, the layer one 174 may convert coded symbols into in-phase/quadrature (IQ) signals. In aspects, the operational partitions for processing upstream data traffic of the layer one 174 may include CP 182A, FFT 183A, Demap 184A, Channel 185A, Eq 186A, Demod 187A, Descram 188A, Rate 189A, Decoding 190A, and CRC 191A. In aspects, the operational partitions for processing downstream data traffic in the layer one 174 may include CRC 191B, Coding 190B, Rate 189B, Scram 188B, Mod 187B, Layer 186B, Precode 185B, Map 184B, iFFT 183B, and CP 182B.

Partitions in the layer two 176 are related to operations for transferring data frames between network hosts over a physical link. In aspects, partitions in the layer two 176 correspond to the data link layer in the OSI seven-layer model. For example, low-MAC 192 is the lowest partition in the layer two 176. Other partitions above the low-MAC 192 include an ascending sequence of layers, high-MAC 193, low-radio link control (RLC) 194, and high-RLC 195.

Partitions in layer three 178 are related to operations for forwarding data packets through routers. In aspects, the layer three 178 corresponds to the network layer in the OSI seven-layer model. The partitions in the layer three 178 may be associated with protocol-governed operations such as packet data convergence protocol 196 (PDCP), radio resource control 197A (RRC) and service data adaptation protocol 197B (SDAP).

In aspects, a combination of the DU 112 and CU 118 in the far-edge datacenter 110 may process partitions associated with the layer one 174, the layer two 176, and at least a part of the layer three 178. In particular, respective RAN servers 116 may include central processing units (CPUs) and a variety of accelerators for processing data associated with one or more partitions of the operational partitions 170.

As will be appreciated, the various methods, devices, applications, features, etc., described with respect to FIG. 1 are not intended to limit the example system 100 to being performed by the particular applications and features described. Accordingly, additional controller configurations may be used to practice the methods and systems herein and/or features and applications described may be excluded without departing from the methods and systems disclosed herein.

Figure 2:
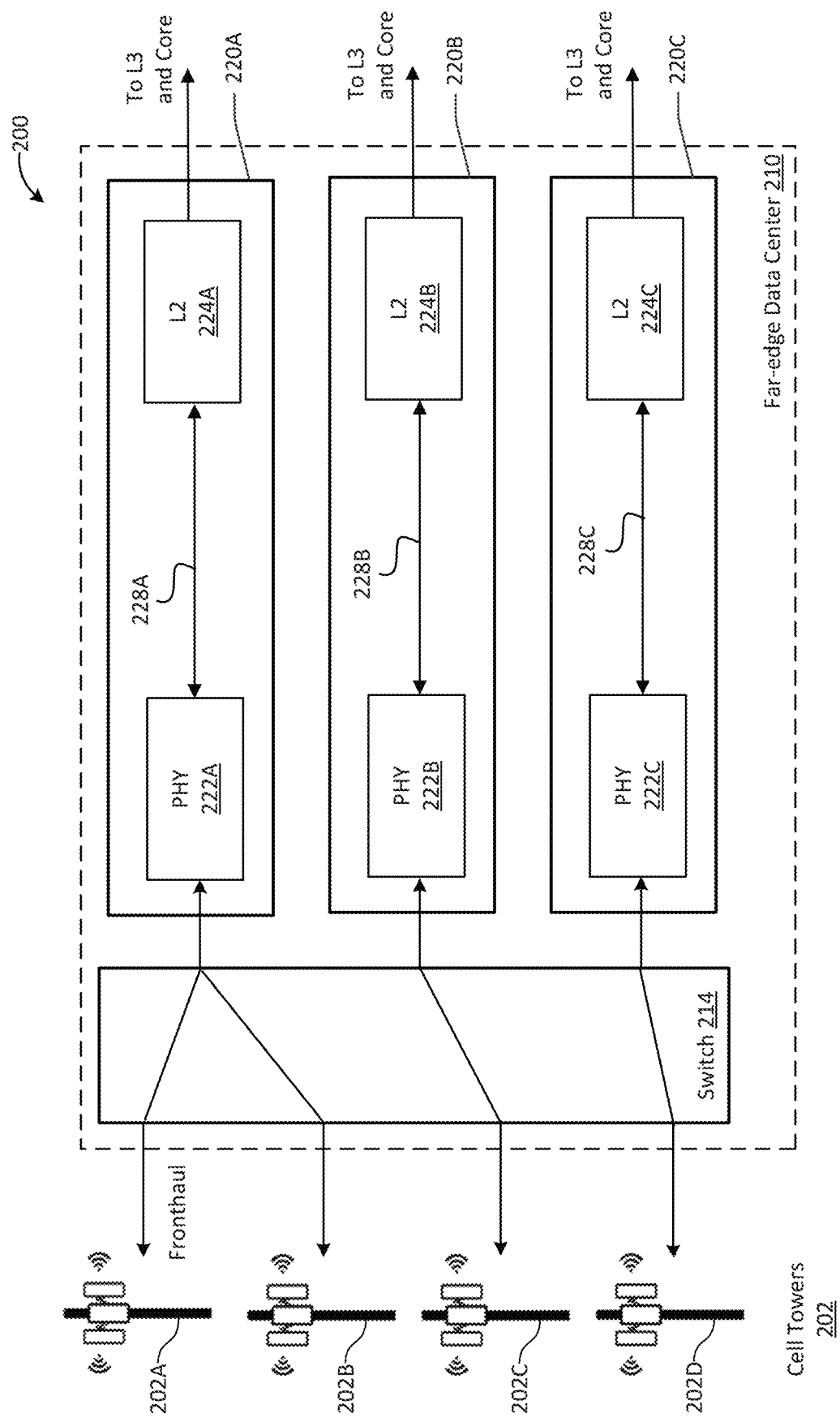
FIG. 2 illustrates an example far-edge datacenter of a cloud RAN, in accordance with aspects of the present disclosure.

FIG. 2 illustrates an example far-edge datacenter 210 of a RAN environment 200. The far-edge datacenter 210 includes at least a switch 214 and vRANs 220A-C hosted by one or more RAN servers. The switch 214 connects cell towers 202A-D to the vRANs 220A-C via fiber-optic fronthaul links.

In aspects, each vRAN 220A-C in the far-edge datacenter 210 operates to process data at respective layer one (PHY) and layer two (L2). The PHY is responsible for signal processing tasks (e.g., channel estimation, modulation/demodulation, forward error correction, etc.), while the L2 is responsible for scheduling the frequency and time resources among user equipment (UE). The L2 also connects to higher layers (e.g., L3) as well as the core network.

In an example, each vRAN 220A-C in the far-edge datacenter 210 may run one PHY and one L2. For example, the vRAN 220A may run PHY 222A and L2 224A that communicate via a shared-memory channel 228A; the vRAN 220B may run PHY 222B and L2 224B that communicate via a shared-memory channel 228B; and the vRAN 220C may run PHY 222C and L2 224C that communicate via a shared-memory channel 228C. In other examples, the PHY and L2 may run on different servers, communicating with a network protocol such as the network functional application platform interface (nFAPI).

In the RAN environment 200, the mappings between components are typically fixed (e.g., cell towers to servers). Moreover, the PHY and L2 must be placed on the same vRAN because they communicate over a communication channel in the vRAN. Such setup, however, can have a drastic impact on user connectively. For example, when a fault occurs in a PHY process (e.g., hardware failure, software failure, etc.), a UE may become disconnected for an extended period of time (e.g., as much as 170 seconds) due to the time needed for the L2 to initialize a new PHY and for the UE to re-attach to the cell tower. As an example, when updating PHY software (e.g., planned maintenance), connectively downtime may be created because stopping the current PHY application and restarting a new version causes a disconnection between the cell towers and the PHY.

Figure 3A:
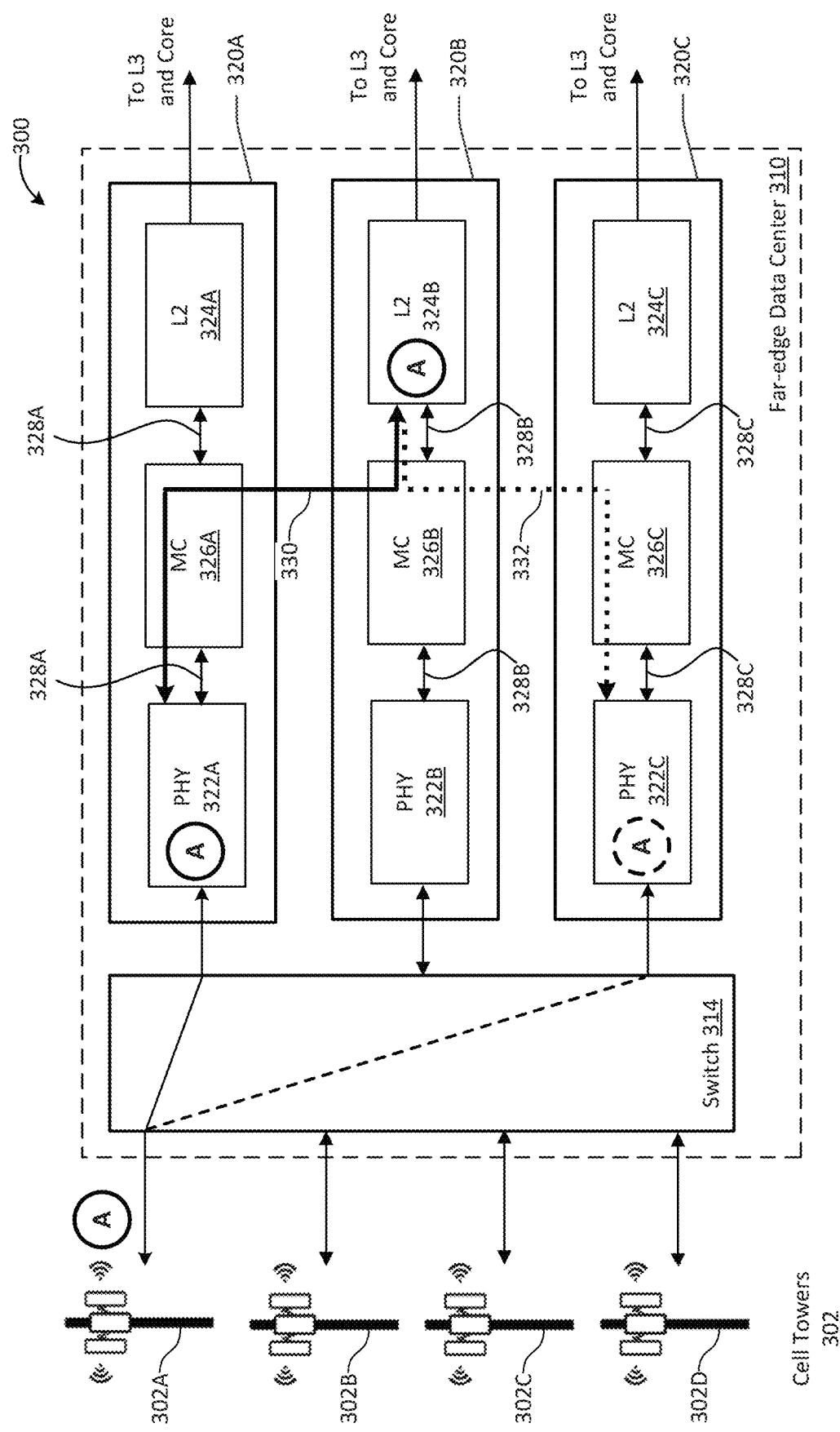
FIG. 3A illustrates an example far-edge datacenter of a cloud RAN implementing dynamic re-routing of layer traffic, in accordance with aspects of the present disclosure.

To address the above issues, FIG. 3A illustrates an example far-edge datacenter of a cloud RAN implementing dynamic re-routing of layer traffic. Dynamic re-routing of layer traffic is possible because PHY processing is focused on signal processing tasks against radio data, and in some examples, only performing signal processing tasks against the radio data. This means that a PHY process can be transferred across servers without any state transfer since the L2 and higher layers maintain related states, such as the states of the PHY, RUs, UEs and other resources. Although dynamic re-routing of layer traffic does not require state transfer for the PHY, the PHY is not entirely stateless. Instead, the PHY is "slot-stateless," meaning that discarding the PHY's state across slots does not substantially affect end user connectivity.

A slot is a basic unit of time in radio protocols. The PHY performs work at the granularity of slots. For example, for every slot, the L2 issues requests to the PHY that describe the signal processing tasks to be performed during that slot (e.g., the set of UEs active in that slot, the resource blocks used by each UE, the modulation scheme used by each UE, etc.). The PHY returns per-slot responses with the data decoded on the uplink. Dynamic re-routing of layer traffic between servers occurs at or near the slot boundaries. Specifically, if the original PHY process is performed for slots 0 to i, then the new PHY process can be re-routed to subsequent slots (e.g., i+1, i+2, etc.). Within a slot, PHY processing generates a large amount of intra-slot state in uplink processing in the form of intermediate computation results (e.g., demodulated data before decoding).

Downlink PHY processing is generally slot-stateless, which allows for any such state to be discarded without significant changes to a downlink in-phase/IQ sample packet stream generated by the PHY layer. In contrast, uplink PHY processing may include state information; however, for the reasons described below, this state information may be disregarded in the disclosed migration scenario. For instance, a signal to noise ratio (SNR) value may be maintained for selecting a PHY encoding process (e.g., modulation and coding scheme). However, the SNR state can be ignored during migration, causing the destination PHY to use a stale or default SNR value. This is acceptable because the RAN is already designed to handle such a changed SNR value. As another example of an uplink PHY processing state, a hybrid automatic repeat request (HARQ) buffer may store one or more previously received transmissions for decoding a transmission that the PHY failed to decode. However, the HARQ buffer may also be ignored during migration, causing the destination PHY to use a stale or default HARQ buffer. In this case, PHY or L2-level checks will fail, but the RAN is designed to handle such failures by retransmissions at the RAN's higher layers (e.g., RLC and L3). Thus, ignoring HARQ buffers during migration is also acceptable. Thus, for the reasons stated above, dynamic re-routing of layer traffic may be treated as "slot-stateless" in the sense that ignoring uplink and downlink PHY state across "slots" does not cause substantial user-visible disruptions (e.g., noticeably higher latency).

In FIG. 3A, each vRAN in the far-edge datacenter 310 may run one PHY, one L2, and a message controller (MC). For example, the vRAN 320A may run PHY 322A, L2 324A and MC 326A; the vRAN 320B may run PHY 322B, L2 324B and MC 226B; and the vRAN 320B may run PHY 322B, L2 324B and MC 326B. In other examples, a vRAN may run a PHY and a MC (not shown) or a L2 and a MC (not shown). In aspects, MC 326A may intercept messages from PHY 322A to L2 324A over communication channel 328A; MC 326B may intercept messages from PHY 322B to L2 324B over communication channel 328B; and MC 326C may intercept messages from PHY 322C to L2 324C over communication channel 328C. Dynamic re-routing allows a PHY process running in one PHY of one vRAN to be moved to another PHY running on a different vRAN. To implement this, the MC is interposed between the PHY and L2, where the MC includes a PHY side and a L2 side. Alternatively, for a vRAN running one PHY or one L2, a MC may be associated with the PHY or the L2, respectively, in the vRAN.

In aspects, the MCs 326A-C are software-based modules executed by processors (e.g., CPUs) in the respective vRAN 320A-C. Each MC 326A-C is configured as a shim layer between the PHY and L2 processes. As a result, the MCs 326A-C are compatible with existing vRAN components and hide the existence of any re-routing between a PHY and an L2. The MCs 326A-C are also agnostic to the implementation of other vRAN components so as to allow even closed source PHY and L2 implementations.

The MCs 326A-C communicate with each other over the far-edge datacenter 310's network. In this way, each MC 326A-C can communicate via communication 330 or communication 332 using a network protocol (e.g., UDP, RDMA, etc.) with no inter-slot state, which in turn enables the dynamic re-routing of layer traffic at slot boundaries. Packet losses are rare since the far-edge datacenter 310 statically provisions the network with the required bandwidth and there are no congestion-inducing incast-like situations. To reduce latency, the MCs 326A-C may use one or more established techniques (e.g., kernel-bypass networking, core pinning, lock-free data structures, busy-polling, process-to-completion, etc.) running on a dedicated core to handle any network channel, in various examples.

Accordingly, the MCs 326A-C allow the PHYs 322A-C and L2s 324A-C to run on different servers by converting messages in the shared-memory channels 328A-C between the PHYs 322A-C and L2s 324A-C, respectively, into one or more network packets to be transmitted via communication 330 or communication 332, for example, over the far-edge datacenter 310's network. To do so, the MCs 326A-C may ensure that the PHYs 322A-C and L2s 324A-C receive messages that comply with the femtocell application programming interface (FAPI) specification, for example. In other examples, the MCs 326A-C can be configured to receive/send messages that comply with other suitable specifications.

As further illustrated by FIG. 3A, the cell tower 302A is connected to the vRAN 320A by the switch 314. In aspects, processing for an RU (designated with "A") of the cell tower 302A may be assigned to vRAN 320A for processing. In this example, PHY 322A in vRAN 320A runs an active PHY context for the $RU_A$. In an example, for a PHY-to-L2 messaging path, the PHY 322A in the vRAN 320A may attempt to connect to the L2 324A over the shared-memory channel 328A in the RAN 320A. However, the PHY 322A is connected to the MC 326A instead. In some cases, e.g., failure, load balancing, or the like, messages associated with the PHY context for $RU_A$ running on PHY 322A may be handled by a different L2 on a different server, e.g., L2 324B on vRAN 320B. In this case, when PHY 322A sends a message (e.g., a FAPI message) associated with the PHY processing context for $RU_A$ to the L2 324A, the MC 326A intercepts that message over the shared-memory channel 328A and re-routes the message to the MC 326B in the vRAN 320B via the far-edge datacenter 310's network. MC 326B then places the FAPI message in communication channel 328B on vRAN 320B for further $RU_A$ processing by L2 324B. Since the datacenter 310 is configured with a reliable network, the FAPI message can be transmitted to MC 326B well within the strict RAN TTIs. The L2-to-PHY messaging path is similar, but in the reverse direction.

In further examples, e.g., when a PHY fails (e.g., PHY 322A), the signal processing workload serviced by the failed PHY 322A needs to be migrated to another server. As with the PHY-L2 messaging path described above, this functionality is not available in current vRAN deployments. Two aspects that make PHY migration challenging are real-time latency requirements and high software complexity. First, PHY processing has stringent tail latency requirements among all RAN layers by requiring signal processing tasks to be completed within strict transmission time intervals (TTIs) that can measure as low as 500 μs in 5G's common deployment configurations. As a result, existing approaches (e.g., virtual machine migration) are inapplicable since they require between tens of milliseconds to seconds to complete the migration. Such downtime in PHY processing can cause severe user-visible disruptions. Second, production-grade vRAN software stacks are complex and often proprietary, which makes them difficult or almost impossible to modify to implement any custom migration logic.

As illustrated by FIG. 3A, the PHY processing workload for $RU_A$ handled by PHY 322A may be migrated to a hot, inactive PHY 322C. In aspects, when an L2 (e.g., L2 324B from the example above) associated with the PHY 322A onboards an RU (e.g., $RU_A$), it tries to initialize a PHY (e.g., PHY 322A) by sending it a message (e.g., a FAPI message). In aspects, an L2-side of an MC (e.g., MC 326B) associated with the L2 324B may intercept the message and create a duplicate copy of the request. The L2-side of MC 326B may then choose two or more RAN servers to initialize an active PHY (e.g., PHY 322A) and one or more inactive PHYs (e.g., PHY 322C) based on cluster configuration information determined by a management thread of MC 326B, for example. The L2-side of MC 326B may then send an initialization message to each MC (e.g., MC 326A and MC 326C, respectively) associated with PHYs on the chosen servers (e.g., PHY 322A and PHY 322C). In aspects, the two or more chosen servers may already be handling active and/or inactive PHY processing for other RUs. In aspects, each PHY (e.g., PHY 322A and PHY 322C) receives the initialization message from its PHY-side MC (e.g., PHY-side MC 326A and PHY-side MC 326C, respectively) and initializes a PHY context for the RU (e.g., $RU_A$). As illustrated by FIG. 3A, PHY 322A may be an active PHY context whereas PHY 322C may be a hot, inactive PHY context. That is, in this example, PHY 322A is assigned a processing workload for $RU_A$, whereas PHY 322C is not assigned any actual processing work for $RU_A$ but receives regular messages from its PHY-side MC (e.g., MC 326C) to keep its PHY context in an available (or alive) state.

Figure 3B:
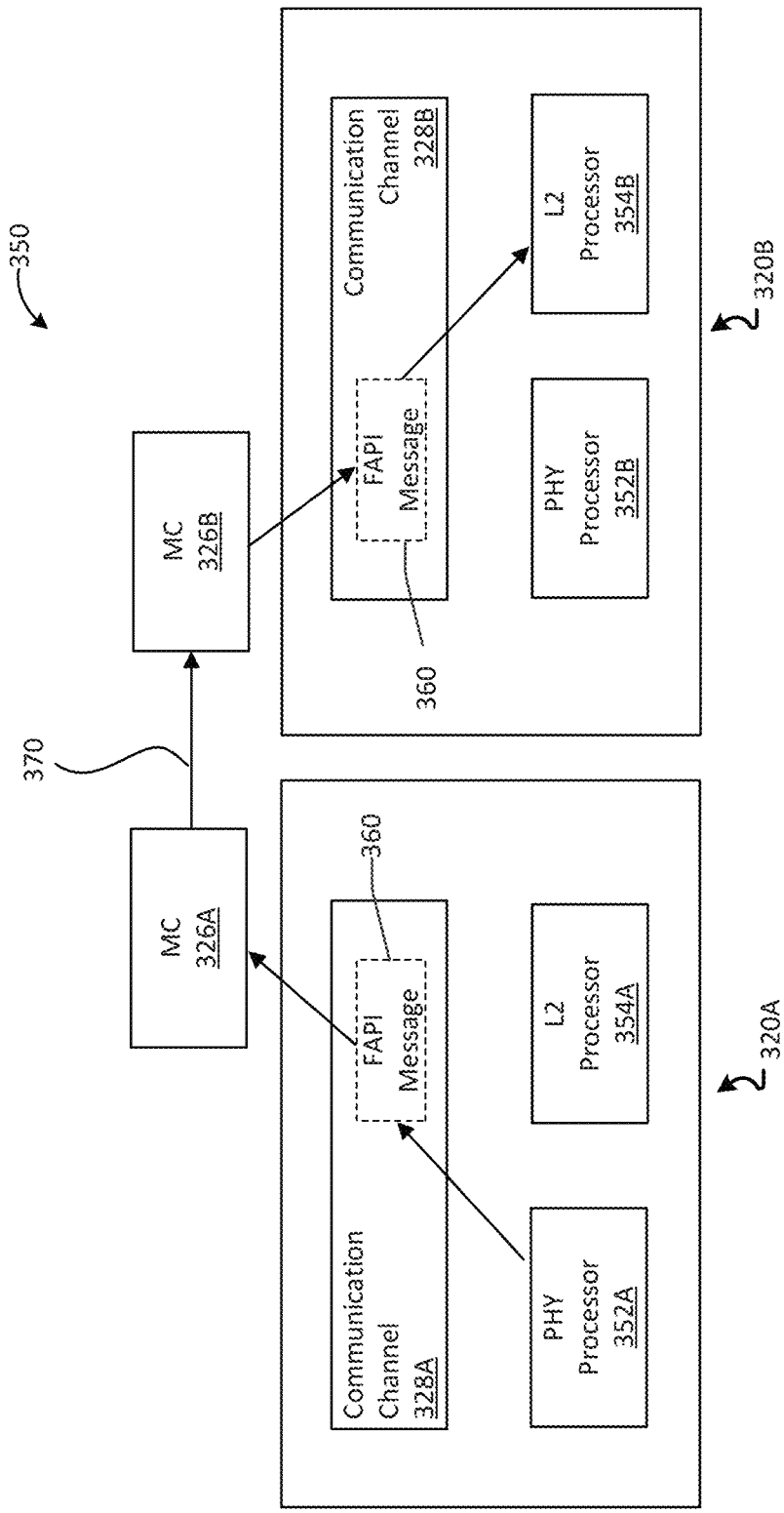
FIG. 3B illustrates an example process for dynamic re-routing of layer traffic, in accordance with aspects of the present disclosure.

FIG. 3B illustrates an example process 350 for dynamically re-routing layer traffic. The process 350 may be implemented in the far-edge datacenter 310 of FIG. 3A, for example. In aspects, the process 350 involves dynamic message re-routing between vRAN 320A and vRAN 320B (FIG. 3A). The vRAN 320A may run a PHY layer and a L2 layer with a PHY processor 352A and a L2 processor 354A, respectively. Similarly, the vRAN 320B may run a PHY layer and a L2 layer with a PHY processor 352B and an L2 processor 354B. As illustrated, each vRAN includes a MC. For example, the vRAN 320A includes a MC 326A and the vRAN 320B includes a MC 326B. The MCs 326A-B operate to re-route layer traffic (e.g., PHY-L2, L2-PHY) in the vRANs 320A-B. To do so, the MC 326A continuously monitors for messages in communication channel 328A and the MC326B continuously monitors for messages in communication channel 328B. In aspects, the communication channels 328A-B are located in respective vRAN 320A-B.

For PHY-L2 messaging, the PHY processor 352A may attempt to send a FAPI message 360 to the L2 processor 354A by placing the FAPI message 360 in the communication channel 328A of vRAN 320A. However, the FAPI message 360 may be intercepted by MC 326A and re-routed to the L2 processor 354A of vRAN 320B instead. In particular, the MC 326A monitors the communication channel 328A to intercept FAPI messages, e.g., the FAPI message 360. Rather than the L2 processor 354A retrieving the FAPI message 360 from the communication channel 328A, the MC 326A re-routes the FAPI message 360 to the MC 326B via a network channel 370. Once received, the MC 326B places the FAPI message 360 in the communication channel 328B of vRAN 320B. The L2 processor 354B is then able to access the FAPI message 360 in the communication channel 328B. Since FAPI messages may exceed the maximum transmission unit (MTU) of the network, MC 326A and MC 326B may implement fragmentation (e.g., packetization) and reassembly of the FAPI message 360, respectively. For an L2-to-PHY messaging, the process may proceed in the reverse direction.

As indicated above, each message controller (MC) may be implemented as two separate components. For example, the MC 326A includes a first controller portion coupled to the PHY processor 352A and a second controller portion coupled to the L2 processor 354A. Similarly, the MC 326B includes a third controller portion coupled to the PHY processor 352B and a fourth controller portion coupled to the L2 processor 354B. In operation, a message from the PHY processor 352A to the L2 processor 354A is intercepted by the first controller portion of the MC 326A. The second controller portion of the MC 326A then sends the message to the fourth controller portion of the MC 326B so that the message is re-routed to the L2 processor 354B instead.

Figure 4A:
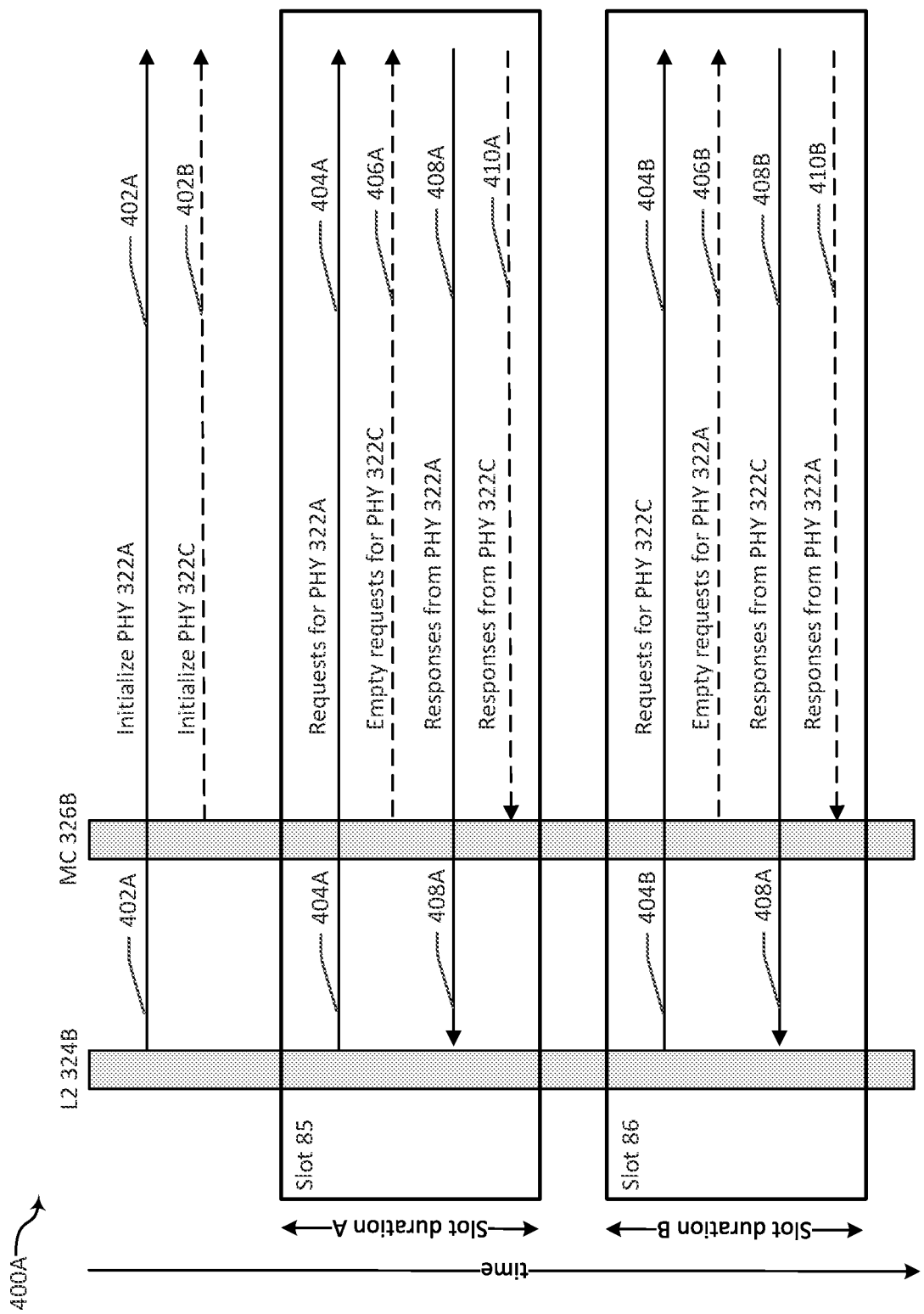
FIG. 4A illustrates an example process for migrating a PHY process from one PHY context running on one RAN server to another PHY context running on a different RAN server, in accordance with aspects of the present disclosure.

FIG. 4A illustrates an example process for migrating a PHY process from one PHY context running on one vRAN to another PHY context running on a different vRAN, in accordance with aspects of the present disclosure. For example, FIG. 4A illustrates a simplified example of MC actions for migrating PHY processing for an RU from a PHY 322A (e.g., FIGS. 3A-B) to a PHY 322C (e.g., FIGS. 3A-B).

In aspects, MCs 326A-C may implement FAPI message transformations on messages sent by the L2 (e.g., L2 324B of FIG. 3A). These transformations may transparently (1) spawn active and inactive PHY contexts on remote servers, (2) maintain inactive PHY contexts with low resource overhead, and (3) migrate PHY processing form an active PHY context to an inactive PHY context when needed. In aspects, FIG. 4A illustrates a simplified view of these three transformations for an RU (e.g., $RU_A$ of FIG. 3A), from the perspective of the RAN server that runs the L2 (e.g., L2 324B of FIG. 3A) for the RU. While MCs 326A-C may not modify messages (e.g., FAPI messages) originating from a PHY, it may filter the messages when they are received at the L2 side of the MC.

To be compatible with existing RAN environments, an MC (e.g., MC 326B) must spawn additional inactive PHY contexts without understanding complex (and potentially proprietary) details of initializing the PHY context. As described above, when an L2 (e.g., L2 324B from the example above) onboards an RU (e.g., $RU_A$), it tries to initialize a PHY (e.g., PHY 322A) by sending it an initialization message 402A (e.g., a FAPI message). In aspects, an L2-side of an MC (e.g., MC 326B) associated with L2 324B may intercept the initialization message 402A and create one or more duplicate copies 402B of the initialization request. The MC 326B may then choose two or more RAN servers to initialize an active PHY (e.g., PHY 322A) and one or more inactive PHYs (e.g., PHY 322C) based on cluster configuration information determined by a management thread of MC 326B, for example. The MC 326B may then send an initialization message (e.g., initialization messages 402A-B) to each MC (e.g., MC 326A and MC 326C), respectively, on the chosen two or more RAN servers, which may already be handling active and/or inactive PHY processing for other RUs. In aspects, each PHY (e.g., PHY 322A and PHY 322C) receives the initialization message 402A-B from its PHY-side MC. That is, PHY 322A may receive initialization message 402A from the PHY-side MC 326A and PHY 322C may receive a duplicate copy initialization message 402B from the PHY-side MC 326C. In response to the initialization messages 402A-B, both PHY 322A and PHY 322C may initialize a PHY context for the RU (e.g., $RU_A$).

Dynamic re-routing of layer traffic can serve to improve several important system properties. First, a PHY process can crash due to various reasons (e.g., hardware failures, crashes of the platform software, etc.). Using dynamic re-routing, the PHY process can resume at a different server which allows vRAN operators to exploit the fungibility of cheap commodity servers to improve availability. Second, updating the PHY software in current vRAN deployments creates user downtime since an active PHY context needs to be stopped and restarted with a new version of the software. Using dynamic re-routing, vRAN operators can spawn a new PHY context and move the RU into the new PHY context without downtime. Third, large variations in user traffic can cause certain portions of RAN servers to be underutilized. Current vRANs deployments do not take into consideration ways to reduce energy consumption. Using dynamic re-routing, vRAN operators can increase energy efficiency by bin-packing the PHY processing into the fewest number of servers based on the current workload and converting the remaining idle servers into a power-saving/power-off state.

In aspects, the FAPI specification requires that a PHY context receive uplink and downlink configuration FAPI requests (e.g., UL_CONFIG and DL_CONFIG) in every slot, specifying the uplink and downlink signal processing work for that slot, respectively. These requests include information such as the set of active UEs, the frequency resources and modulation scheme used by each UE, etc. To keep an inactive PHY available (e.g., "hot") with low resource overhead (e.g., without scheduling real signal processing work to the inactive PHY), the inactive PHY must receive valid UL_CONFIG and DL_CONFIG messages or it may fail (e.g., after failing to receive valid messages over multiple slots). However, "null" versions of UL_CONFIG and DL_CONFIG requests for a slot are treated as valid inputs to the inactive PHY. A null request may have no UE entries, indicating that the inactive PHY does not need to perform uplink or downlink signal processing for this slot. In this way, the present disclosure uses null uplink/downlink requests to keep the inactive PHY context in an available state with low resource overhead. That is, the PHY pipeline generates little computational work or fronthaul traffic for null requests.

As illustrated by FIG. 4A, null requests are used to keep an inactive PHY (e.g., PHY 322C) alive for an example slot 85 without assigning the PHY 322C an actual signal processing workload. For example, when the L2 (e.g., L2 324B of FIG. 3A) sends a request 404A to an active PHY context (e.g., PHY 322A), the associated MC (e.g., MC 326B of FIG. 3A) intercepts the request 404A. MC 326B sends the unmodified request 404A to the active PHY 322A and a null request 406A to the inactive PHY 322C. Both PHYs subsequently send response messages, e.g., active PHY 322A sends response message 408A and inactive PHY 322C sends response message 410A. The L2-side of MC 326A associated with active PHY 322A then sends response message 408A to L2 324B and discards response message 410A received from inactive PHY 322C.

In some cases, the PHY processing for $RU_A$ running on active PHY 322A may need to be migrated to another PHY. For example, PHY 322A may fail, be scheduled for maintenance, or may be running on a server identified for power-down or power-off to conserve energy. This migration may be scheduled to occur at a slot boundary, e.g., between slot 85 having slot duration A and slot 86 having slot duration B. In this case, when the L2 324B sends a request 404B, MC 326B may switch the PHY context with which it exchanges original and null FAPI requests. For example, MC 326B may send the unmodified request 404B to PHY 322C, thereby assigning the PHY 322C a signal processing workload for $RU_A$. In contrast, MC 326B may send a null request 406B to PHY 322A, thereby maintaining PHY 322A as an inactive PHY in an alive state with low resource overhead. As in the example above, both PHYs subsequently send response messages, e.g., active PHY 322C sends response message 408B and inactive PHY 322A sends response message 410B. The L2-side of MC 326C associated with active PHY 322C then sends response message 408B to L2 324B and discards response message 410B received from inactive PHY 322A.

In further examples, PHY migration may be triggered in multiple ways. For instance, a management plane thread with an RPC endpoint may listen for migration requests (e.g., for PHY maintenance) and may forward the requests to a dataplane thread. Migration requests may be sent by vRAN operators or by an external controller (e.g., a RAN Intelligent Controller, RIC). In some aspects, the dataplane thread may trigger migration in response to receiving a PHY failure notification, for example.

Figure 4B:
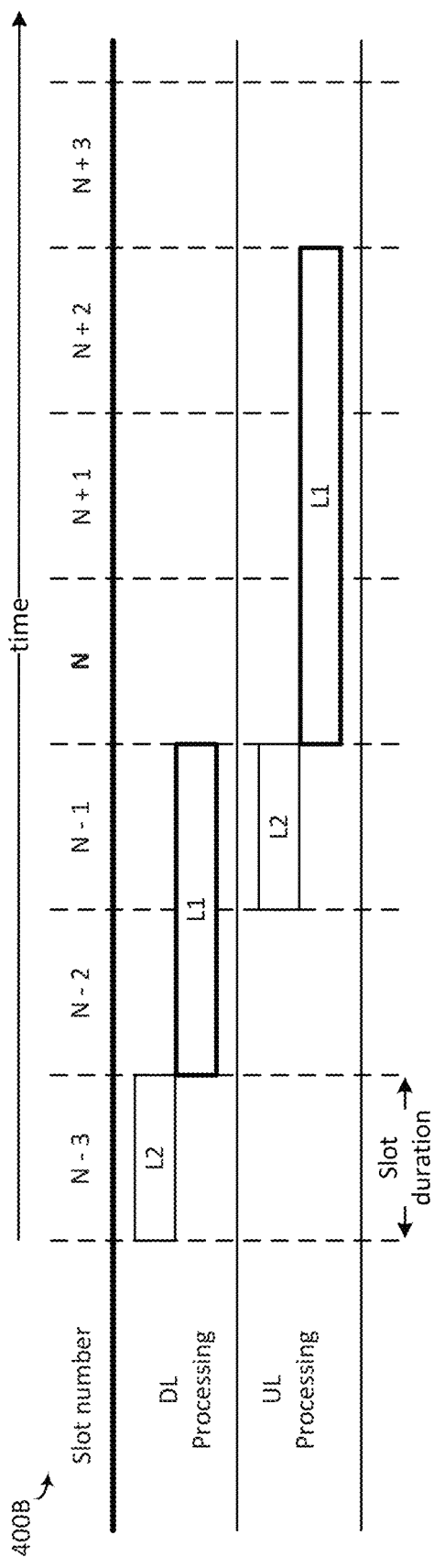
FIG. 4B illustrates pipelined processing tasks for a PHY and an L2 over slots, in accordance with aspects of the present disclosure.

FIG. 4B illustrates pipelined processing tasks for a PHY and an L2 over slots, in accordance with aspects of the present disclosure.

A simplified process for PHY migration is illustrated by FIG. 4A, but implementation of a migration may be more complex. For example, FIG. 4A illustrates all processing for a slot (e.g., slot 85 or slot 86) occurring within a slot duration. However, PHY implementations may be more complex, using a pipeline of tasks to process a slot. FIG. 4B illustrates pipelining for uplink processing on an example PHY and an over-the-air (OTA) slot N. In aspects, the PHY may receive a DL_CONFIG message specifying downlink UE transmissions in slot N−3. The PHY may receive downlink IQ samples for the slot N−3 in slot N−2 and may perform downlink signal processing in slots N−2 through N−1 and may return a response to the L2 in slot N−1. Similarly, the PHY may receive a UL_CONFIG message specifying uplink UE transmissions in slot N−1 from an L2. The PHY may receive uplink IQ samples for the slot N−1 in slot N and may perform uplink signal processing in slots N through N+2 and may return a response to the L2 in slot N+3.

Figure 4C:
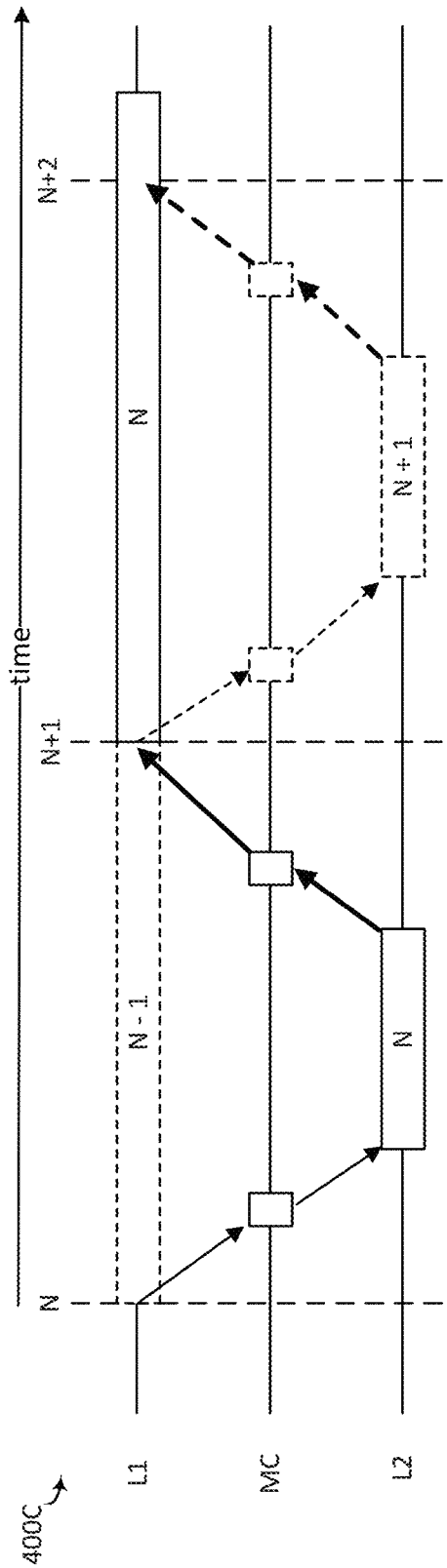
FIG. 4C illustrates slot timing of messages to accommodate pipelined processing tasks for a PHY and an L2 over slots, in accordance with aspects of the present disclosure.

FIG. 4C illustrates slot timing of messages to accommodate pipelined processing tasks for a PHY and an L2 over slots, in accordance with aspects of the present disclosure.

In aspects, the FAPI transformations described above are designed to account for pipelining. For example, to execute a planned migration beginning at the start of slot N, the L2-side MC starts re-routing in advance, sending a full instead of a null UL_CONFIG request in slot N−1 to a hot, inactive PHY context. Additionally, the L2-side MC continues to accept uplink responses from the active PHY for OTA slots prior to N, which it may receive until slot N+2. During an unplanned migration (e.g., during primary PHY failure), the L2-side MC may do best-effort resolution of the pipeline. In aspects, as illustrated by FIG. 4C, the MC may share the slot time budget (e.g., slot duration) with the L2. For a stable PHY migration, the MC latency plus the L2 latency should be limited to the duration of one slot. In this way, a stable PHY migration has minimal impact on latency and does not cause substantial user-visible disruptions.

Figure 5A:
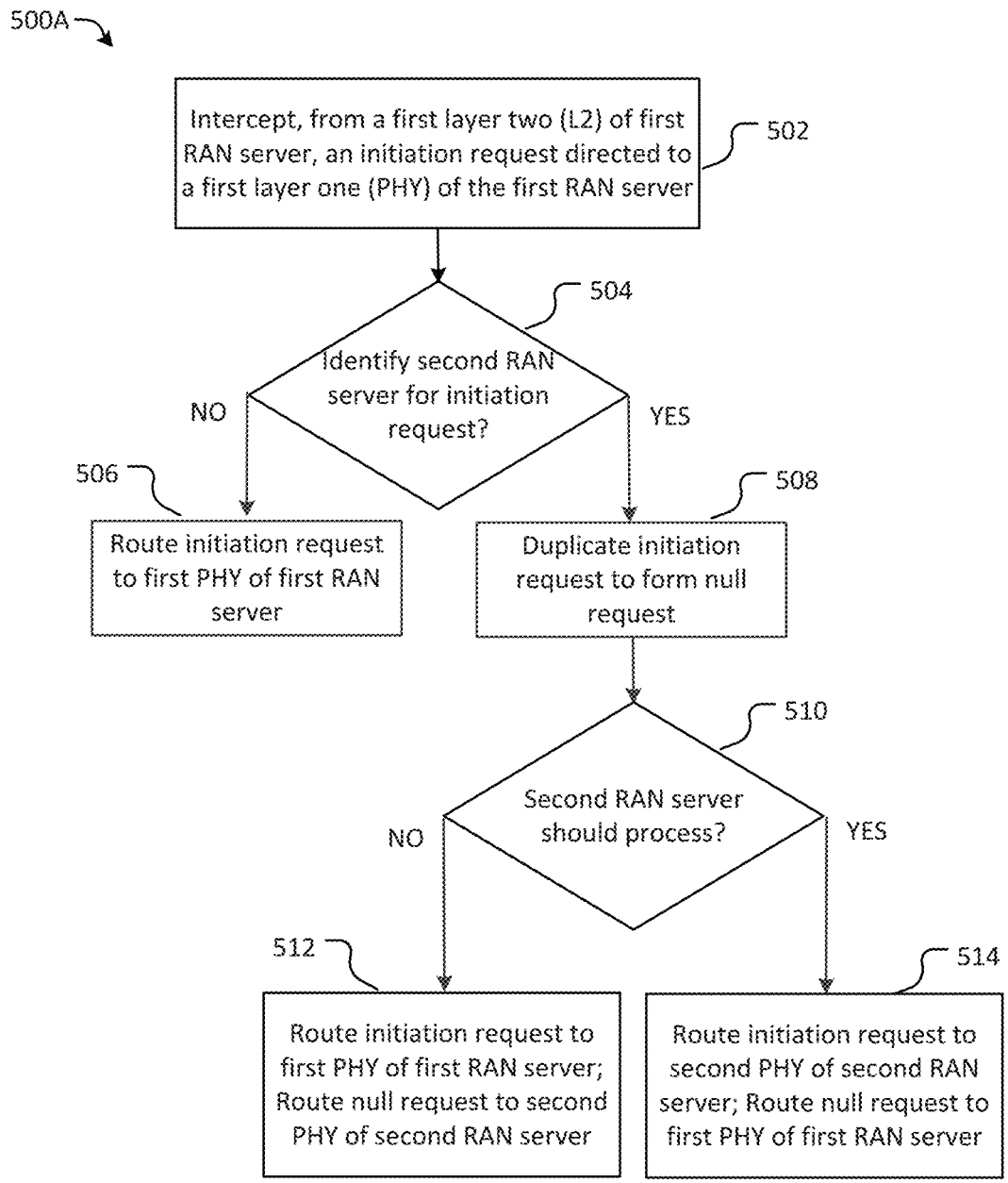
FIG. 5A illustrates an example method for initiating a first active PHY context on a first RAN server and a second inactive PHY context on a second RAN server, in accordance with aspects of the present disclosure.

FIG. 5A illustrates an example method for initiating a first active PHY context on a first RAN server and a second inactive PHY context on a second RAN server, in accordance with aspects of the present disclosure.

A general order of the operations for the method 500A is shown in FIG. 5A. Generally, the method 500A may include more or fewer steps or may arrange the order of the steps differently than those shown in FIG. 5A. The method 500A can be executed as a set of computer-executable instructions executed by a computer system and encoded or stored on a computer readable medium. Further, the method 500A can be performed by gates or circuits associated with a processor, an ASIC, an FPGA, a SOC or other hardware device. Hereinafter, the method 500A shall be explained with reference to the systems, components, devices, modules, software, data structures, data characteristic representations, signaling diagrams, methods, etc., described in conjunction with FIGS. 1-4B. For example, aspects of method 500A may be performed by vRANs, such as the vRANs 120 on RAN servers 116 of FIG. 1 and the vRANs 320A-C of FIGS. 3A-3B.

At intercept operation 502, a message controller (MC) may intercept an initiation request from a first layer two (L2) of a first RAN server. For instance, the initiation request may be intercepted by an L2-side of the MC associated with the first L2. The MC may intercept the initiation request by monitoring a communication channel (e.g., a shared-memory channel, a network channel, or the like) between a first layer one (PHY) and the first L2 of the first RAN server. As described above, when an L2 onboards an RU, it may initialize an L1 (PHY) for signal processing by sending the initialization request, e.g., as a FAPI message. In aspects, the FAPI specification requires that an L1 (e.g., PHY context) receive uplink and downlink configuration FAPI requests (e.g., UL_CONFIG and DL_CONFIG) in every slot, specifying the uplink and downlink signal processing work for that slot, respectively. For instance, information (or instructions) for performing the signal processing tasks may include the set of UEs active in that slot, the resource blocks used by each UE, the modulation scheme used by each UE, etc.

At determination operation 504, a management thread of the MC may identify at least a second RAN server on which to initialize an active and/or an inactive PHY. The determination may be based on cluster configuration information, for example. If the MC does not identify a second RAN server, the method may progress to route operation 506. If the MC identifies a second RAN server, the method may progress to duplicate operation 508.

At route operation 506, when the MC does not identify a second RAN server, the MC may route the initialization request to the first PHY of the first RAN server. In this case, the first PHY of the first RAN server may process radio signals for the RU based on the information (or instructions) included in the initialization request. As noted above, the information may describe the signal processing tasks to be performed by the first PHY during a slot (e.g., the set of UEs active in that slot, the resource blocks used by each UE, the modulation scheme used by each UE, etc.).

At duplicate operation 508, when the MC identifies a second RAN server, the MC may create one or more duplicate copies of the initialization request. For instance, the MC may duplicate the FAPI request (e.g., UL_CONFIG or DL_CONFIG). In aspects, duplicating the initialization request may include removing the information describing the signal processing tasks to be performed by the PHY during the slot (e.g., the set of UEs active in that slot, the resource blocks used by each UE, the modulation scheme used by each UE, etc.). Thus, the duplicate initialization request may be a null initialization request. As described above, an inactive PHY must receive valid UL_CONFIG or DL_CONFIG messages or it may fail (e.g., after failing to receive valid messages over multiple slots). However, "null" versions of UL_CONFIG and DL_CONFIG requests for a slot are treated as valid inputs to an inactive PHY. A null request may have no UE entries, indicating that the inactive PHY does not need to perform uplink or downlink signal processing for this slot. In this way, the inactive PHY context may be maintained in an available state by using the null uplink/downlink requests. but the inactive PHY context may be associated with low resource overhead because the PHY pipeline generates little computational work or fronthaul traffic for null requests.

At determination 510, it may be determined whether the second RAN server is should initiate a PHY context for performing the signal processing for the RU. For instance, the second RAN server may be preferred to enable load balancing of PHY processing across RAN servers, for offloading the first RAN server due to planned maintenance, as a failover RAN server when the first PHY of the first RAN server fails, or the like. If the second RAN server is preferred, the method may progress to route operation 514. If the second RAN server is not preferred, the method may progress to route operation 512.

At route operation 512, when the second RAN server is not preferred, the MC may route the initialization request to the first PHY of the first RAN server. Based on the information included in the initialization request, the first PHY of the first RAN server may process radio signals for the RU. In this way, in response to the initialization request, the first PHY of the first vRAN may become an active PHY context for the RU. In contrast, when the second RAN server is not preferred, the null request may be routed to the second PHY of the second RAN server. In this way, in response to the null request, the second PHY of the second RAN server may become an inactive, hot PHY context for the RU. Accordingly, based on receiving the null request, the second PHY of the second RAN server may be maintained in an alive state should processing need to be migrated from the first PHY of the first RAN server. Moreover, based on the null request not including the processing information, the second PHY of the second RAN server may be maintained in an inactive state (e.g., not performing signal processing) to promote energy efficiency.

At route operation 514, when the second RAN server is preferred, the MC may route the initialization request to the second PHY of the second RAN server. Based on the information included in the initialization request, the second PHY of the second RAN server may process radio signals for the RU. In this way, in response to the initialization request, the second PHY of the second vRAN may become an active PHY context for the RU. In contrast, when the second RAN server is preferred, the null request may be routed to the first PHY of the first RAN server. In this way, in response to the null request, the first PHY of the first RAN server may become an inactive, hot PHY context for the RU. Accordingly, based on receiving the null request, the first PHY of the first RAN server may be maintained in an alive state should processing need to be migrated from the second PHY of the second RAN server. Moreover, based on the null request not including the processing information, the first PHY of the first RAN server may be maintained in an inactive state (e.g., not performing signal processing) to promote energy efficiency.

As should be appreciated, the operations 502-514 are described for purposes of illustrating the present methods and systems and are not intended to limit the disclosure to a particular sequence of steps. That is, steps may be performed in different order, additional steps may be performed, and disclosed steps may be excluded without departing from the present disclosure.

Figure 5B:
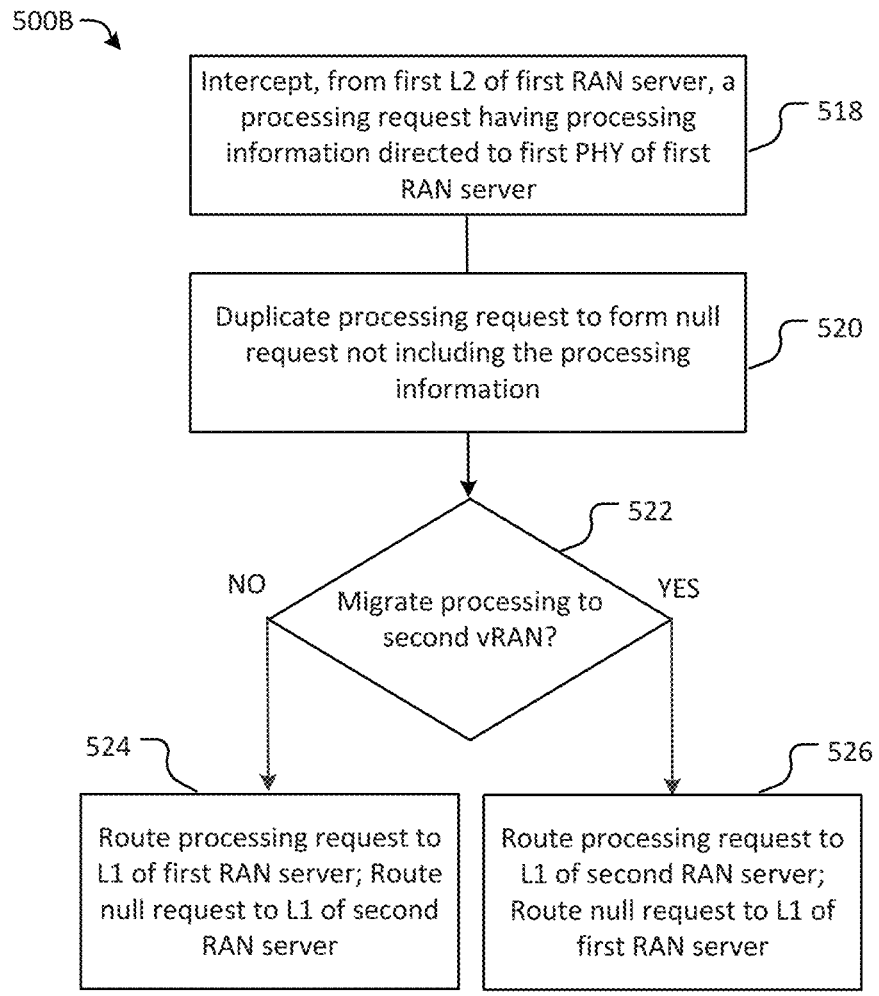
FIG. 5B illustrates an example method for migrating a PHY process from a first active PHY context on a first RAN server to a second inactive PHY context running on a second RAN server, in accordance with aspects of the present disclosure.

FIG. 5B illustrates an example method for migrating a PHY process from a first active PHY context on a first vRAN to a second inactive PHY context running on a second vRAN, in accordance with aspects of the present disclosure.

A general order of the operations for the method 500B is shown in FIG. 5B. Generally, the method 500B may include more or fewer steps or may arrange the order of the steps differently than those shown in FIG. 5B. The method 500B can be executed as a set of computer-executable instructions executed by a computer system and encoded or stored on a computer readable medium. Further, the method 500B can be performed by gates or circuits associated with a processor, an ASIC, an FPGA, a SOC or other hardware device. Hereinafter, the method 500B shall be explained with reference to the systems, components, devices, modules, software, data structures, data characteristic representations, signaling diagrams, methods, etc., described in conjunction with FIGS. 1-4B. For example, aspects of method 500B may be performed by vRANs, such as the vRANs 120 on RAN servers 116 of FIG. 1 and the vRANs 320A-C of FIGS. 3A-3B.

At intercept operation 518, a message controller (MC) may intercept a processing request from a first layer two (L2) of a first vRAN hosted by a first RAN server. For instance, the processing request may be intercepted by an L2-side of the MC associated with the L2. The MC may intercept the processing request by monitoring a communication channel (e.g., a shared-memory channel, a network channel, or the like) between a first PHY and the first L2 of the first RAN server. In aspects, the processing request may include information for performing the signal processing tasks for the RU, which may include the set of UEs active in that slot, the resource blocks used by each UE, the modulation scheme used by each UE, etc. In further aspects, the processing request may be a FAPI request (e.g., UL_CONFIG and DL_CONFIG), specifying the uplink and downlink signal processing work for a slot. For instance, the FAPI request may include information for performing the signal processing tasks, including the set of UEs active in that slot, the resource blocks used by each UE, the modulation scheme used by each UE, etc.

At duplicate operation 520, the MC may create one or more duplicate copies of the processing request. For instance, the MC may duplicate the FAPI request (e.g., UL_CONFIG or DL_CONFIG). In aspects, duplicating the processing request may include removing the information describing the signal processing tasks to be performed by the L1 during the slot (e.g., the set of UEs active in that slot, the resource blocks used by each UE, the modulation scheme used by each UE, etc.). Thus, the duplicate processing request may be a null initialization request.

At migrate determination 522, it may be determined whether to migrate signal processing from the first PHY of the first vRAN hosted by the first RAN server to a second PHY of a second vRAN hosted by a second RAN server. It may be determined to migrate the processing for any number of reasons, including load balancing of PHY processing across RAN servers, for offloading the first RAN server due to planned maintenance, when the first PHY of the first vRAN on the first RAN server fails, or the like. If it is determined not to migrate signal processing from the first PHY of the first RAN server to the second PHY of the second RAN server, the method may progress to route operation 524. If it is determined to migrate signal processing from the first PHY of the first RAN server to the second PHY of the second RAN server, the method may progress to route operation 526.

At route operation 524, when it is determined not to migrate signal processing, the MC may route the processing request to the first PHY of the first vRAN on the first RAN server. Based on the information included in the processing request, the first PHY of the first RAN server may process radio signals for the RU. Thus, based on the processing request, the first PHY of the first RAN server may be the active PHY context for the RU. In contrast, when it is determined not to migrate signal processing, the null request may be routed to the second PHY of the second vRAN hosted by the second RAN server. In this way, in response to the null request, the second PHY of the second RAN server may be an inactive, hot PHY context for the RU. Accordingly, based on receiving the null request, the second PHY of the second RAN server may be maintained in an alive state should processing need to be migrated from the first PHY of the first RAN server. Additionally, based on the null request not including the processing information, the second PHY of the second vRAN may be maintained in an inactive state (e.g., not performing signal processing) to promote energy efficiency.

At route operation 526, when it is determined to migrate signal processing, the MC may route the processing request to the second PHY of the second vRAN on the second RAN server. Based on the information included in the processing request, the second PHY of the second RAN server may process radio signals for the RU. Thus, based on the processing request, the second PHY of the second vRAN may be changed to the active PHY context for the RU. In contrast, when it is determined to migrate signal processing, the null request may be routed to the first PHY of the first vRAN hosted by the first RAN server. In this way, in response to the null request, the first PHY of the first RAN server may be changed to an inactive, hot PHY context for the RU. Accordingly, based on receiving the null request, the first PHY of the first RAN server may be changed to an alive state should processing need to be migrated from the second PHY of the second RAN server. Additionally, based on the null request not including the processing information, the first PHY of the first RAN server may be changed to an inactive state (e.g., not performing signal processing) to promote energy efficiency.

As should be appreciated, the operations 518-526 are described for purposes of illustrating the present methods and systems and are not intended to limit the disclosure to a particular sequence of steps. That is, steps may be performed in different order, additional steps may be performed, and disclosed steps may be excluded without departing from the present disclosure.

Figure 6:
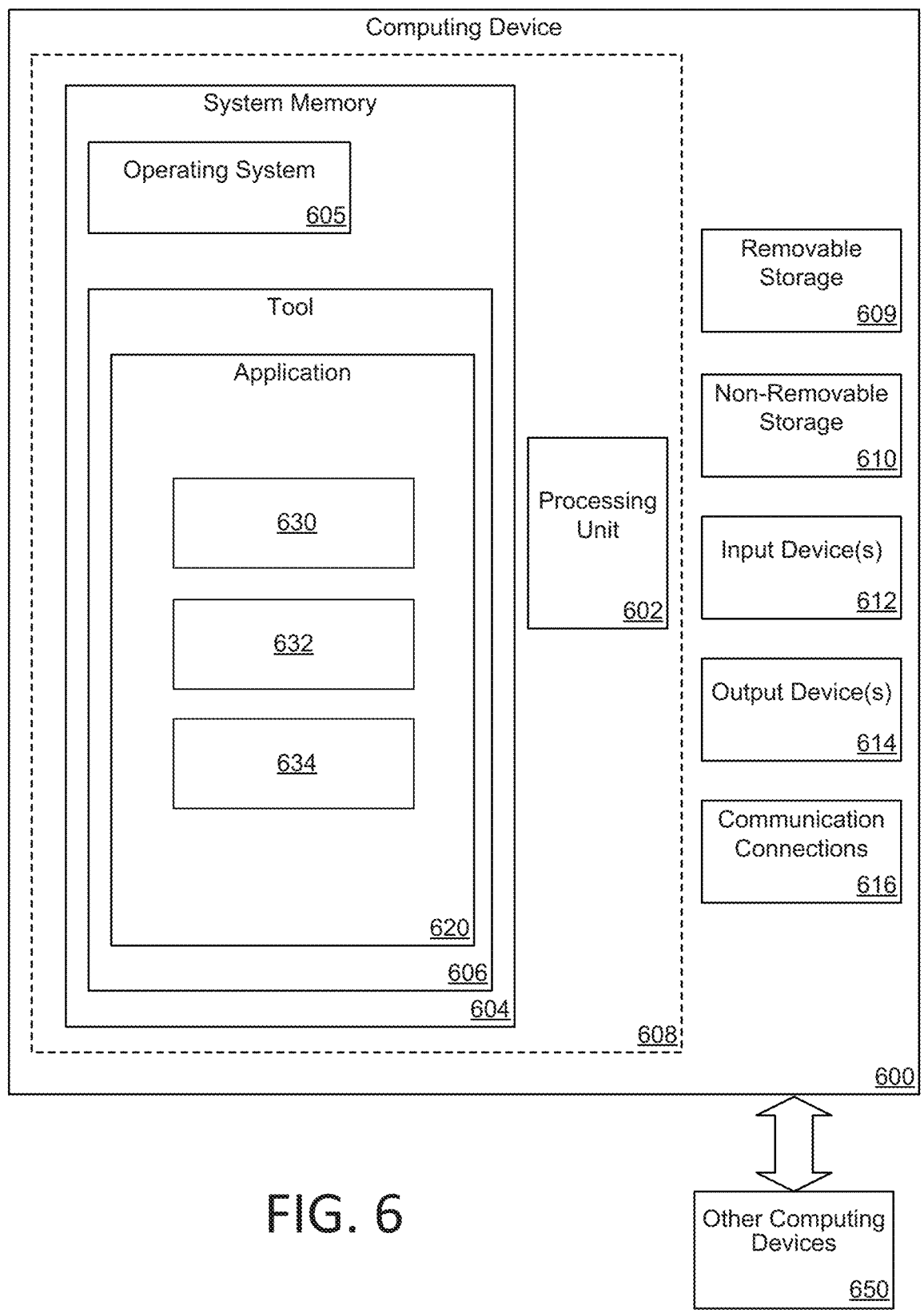
FIG. 6 is a block diagram illustrating example physical components of a computing device with which aspects of the present disclosure may be practiced.

FIG. 6 is a block diagram illustrating physical components (e.g., hardware) of a computing device 600 with which aspects of the disclosure may be practiced. The computing device components described below may have computer executable instructions for implementing a message controller 620 as a shim between layer one and layer two of a DU running on a RAN server (e.g., RAN server 116), including computer executable instructions for implementing the message controller 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for implementing the message controller 620, such as one or more components with regard to FIGS. 1-4B and, in particular, message interceptor 630, message duplicator 632, and PHY migrator 634.

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program tools 606 (e.g., message controller 620) may perform processes including, but not limited to, the aspects, as described herein. Other program tools that may be used in accordance with aspects of the present disclosure, and in particular for migrating PHY processing from one PHY context on a first server to another PHY context on a second server in a virtualized radio access network (vRAN), which may include message interceptor 630, message duplicator 632, and PHY migrator 634.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
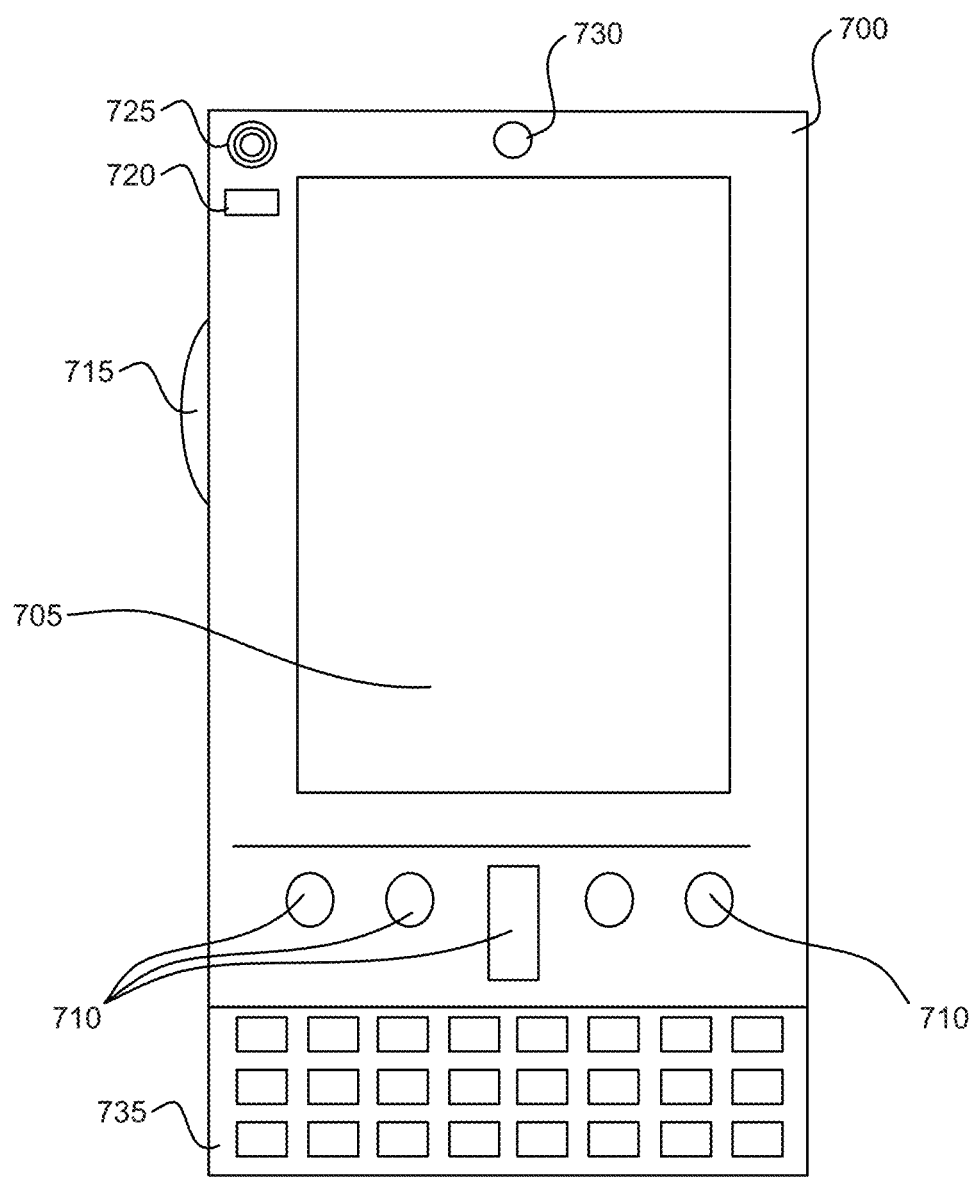
FIG. 7A is a simplified diagram of a mobile computing device with which aspects of the present disclosure may be practiced.
Figure 7B:
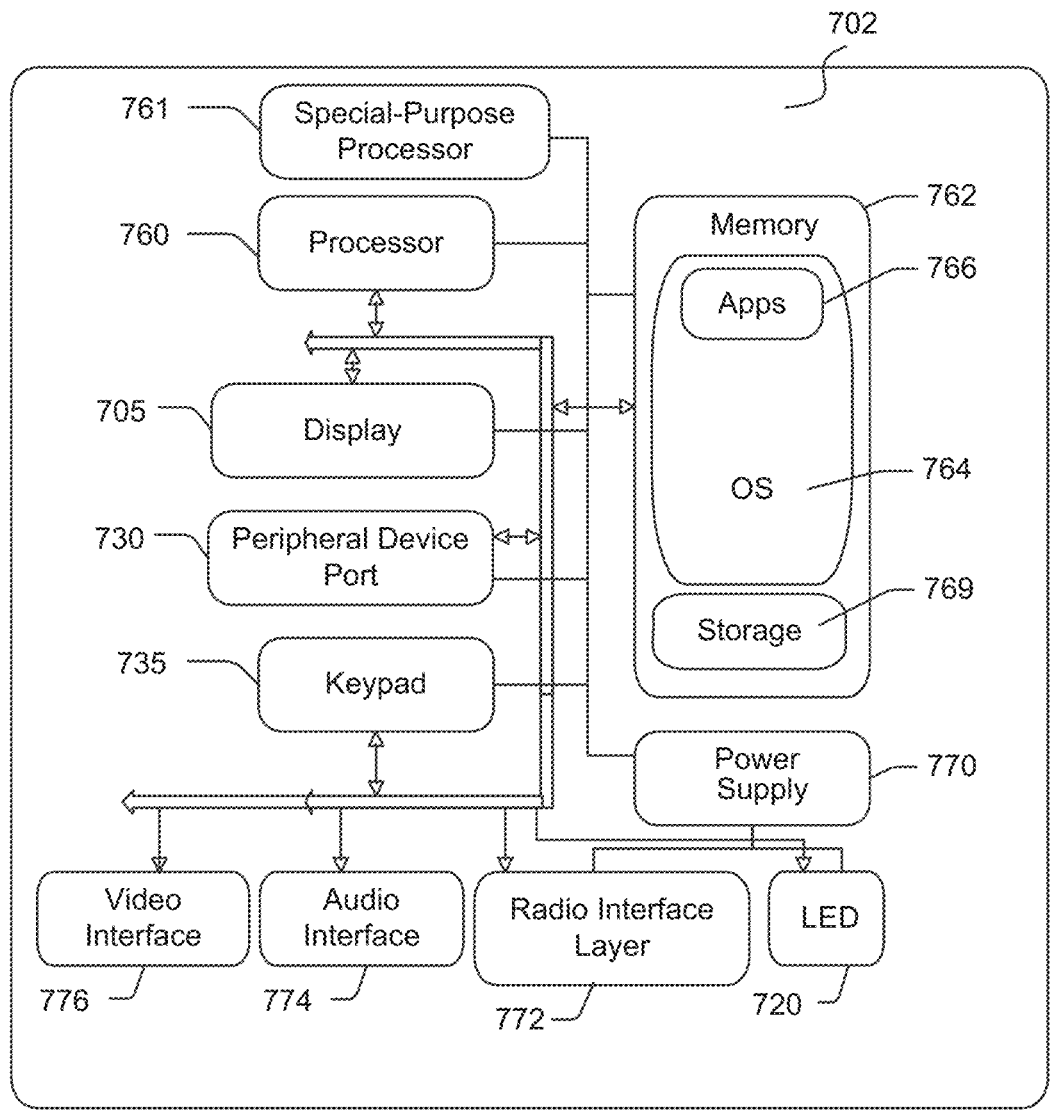
FIG. 7B is another simplified block diagram of a mobile computing device with which aspects of the present disclosure may be practiced.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. In some aspects, the client utilized by a user (e.g., a user of the client device 102 as shown in the system 100 in FIG. 1) may be a mobile computing device.

With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included as an optional input element, a side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of computing device, a server (e.g., RAN servers 116 as shown in FIG. 1), a mobile computing device, etc. That is, the mobile computing device 700 can incorporate a system 702 (e.g., a system architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 868 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world" via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 (e.g., LED) may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of devices connected to a peripheral device port 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The description and illustration of one or more aspects provided in this application are not intended to limit or restrict the scope of the disclosure as claimed in any way.

The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for migrating PHY processing from one PHY context on a first server to another PHY context on a second server, according to at least the examples provided in the sections below.

In an aspect, a server system is provided. The server system including a first message controller associated with a first layer two (L2) of a first Radio Access Network (RAN) server and memory storing instructions that, when executed by a processor, cause the first message controller to perform operations. The operations including intercepting, from the first L2 of the first RAN server, a first request directed to a first layer one (PHY) of the first RAN server, where the first request includes first information for performing signal processing of one or more first radio unit (RU) signals of a radio unit (RU). Additionally, the operations include duplicating the first request, where duplicating the first request comprises removing the first information to form a first null request. The operations further include routing the first request including the first information to the first PHY of the first RAN server, where the first PHY is active and performs the signal processing on the one or more first RU signals of the RU based on the first information, and routing the first null request not including the first information to a second layer one (PHY) of the second RAN server, where the second PHY is alive based on receiving the first null request and inactive based on the first null request not including the first information.

In an example of the server system, the RU is in communication with the first RAN server. In another example, the duplicating the first request is in response to determining the second RAN server is capable of performing the signal processing on the one or more first RU signals of the RU. In yet another example, the first null request is received by a second message controller associated with the second RAN server. In still another example of the server system, the operations include routing a first response from the first PHY of the first RAN server to the first L2 of the first RAN server and discarding a second response from the second PHY of the second RAN server.

In another example of the server system, the operations further include intercepting, from the first L2, a second request directed to the first PHY of the first RAN server, where the second request includes second information for performing signal processing on one or more second RU signals of the RU. Additionally, the operations include determining the second RAN server should perform the signal processing on the one or more second RU signals of the RU and duplicating the second request, where duplicating the second request comprises removing the second information to form a second null request. The operations further include routing the second request including the second information to the second PHY of the second RAN server, where the second PHY is changed to active and performs the signal processing on the one or more second RU signals of the RU based on the second information and routing the second null request not including the second information to the first PHY of the first RAN server, where the first PHY is alive based on receiving the second null request and is changed to inactive based on the second null request not including the second information. In additional examples of the server system, the second request is routed to the second PHY of the second RAN server in response to a failure notification for the first PHY of the first RAN server. In another example, the second request is routed to the second PHY of the second RAN server based on a planned maintenance schedule for the first PHY of the first RAN server.

In another aspect, a method of migrating signal processing from a first layer two (L2) of a first radio access network (RAN) server to a second layer one (PHY) of a second RAN server is provided. The method includes intercepting, from the first L2 of the first RAN server, a request directed to a first PHY of the first RAN server, where the request includes instructions for performing signal processing of one or more radio unit (RU) signals of a radio unit (RU). Additionally, the method includes determining the second RAN server should perform the signal processing on the one or more RU signals of the RU and duplicating the request, where duplicating the request comprises removing the instructions to form a null request. The method further includes routing the request including the instructions to the second PHY of the second RAN server, where the second PHY is active and performs the signal processing on the one or more RU signals of the RU based on the instructions, and routing the null request not including the instructions to the first PHY of the first RAN server, where the first PHY is alive based on receiving the null request, and where the first PHY is inactive based on the null request not including the instructions.

In an example of the method, routing the request to the second PHY of the second RAN server includes sending the request based on a network protocol over a network to a message controller associated with the second PHY of the second RAN server. In another example, the request is a femtocell application programming interface (FAPI) request in the form of a UL_CONFIG request, where the UL_CONFIG request specifies uplink user equipment (UE) transmissions from the RU, and where the instructions include at least the uplink UE transmissions. In a further example, the null request is a FAPI request in the form of a null UL_CONFIG request and the null UL_CONFIG request does not specify the uplink UE transmissions. In yet another example, the request is routed to the second PHY of the second RAN server in response to a failure notification for the first PHY of the first RAN server. In still another example, the request is routed to the second PHY of the second RAN server based on a planned maintenance schedule for the first PHY of the first RAN server. In another example, the RU is in communication with the first RAN server. In a further example, the request is received by a message controller associated with the second RAN server.

In yet another aspect, a method of migrating signal processing from a first layer two (L2) of a first radio access network (RAN) server to a second layer one (PHY) of a second RAN server is provided. The method includes intercepting, from the first L2 of the first RAN server, a femtocell application programming interface (FAPI) request directed to a first PHY of the first RAN server, where the FAPI request includes information for performing signal processing on one or more radio unit (RU) signals of an RU. Additionally, the method includes determining the second RAN server should perform the signal processing on the one or more RU signals of the RU and duplicating the FAPI request, where duplicating the FAPI request comprises removing the information to form a null FAPI request. The method further includes routing the FAPI request including the information to the second PHY of the second RAN server, where the second PHY is active and performs the signal processing on the one or more RU signals of the RU based on the information, and routing the null FAPI request not including the information to the first PHY of the first RAN server, where the first PHY is alive based on receiving the null FAPI request, and where the first PHY is inactive based on the null FAPI request not including the information.

In an example of the method, the FAPI request is a UL_CONFIG request, where the UL_CONFIG request specifies uplink user equipment (UE) transmissions from the RU, and where the information comprises at least the uplink UE transmissions. In another example, the null FAPI request is a null UL_CONFIG request and the null UL_CONFIG request does not specify the uplink UE transmissions. In a further example, the FAPI request is automatically routed to the second PHY of the second RAN server in response to receiving a failure notification for the first PHY of the first RAN server.

Any of the one or more above aspects in combination with any other of the one or more aspect. Any of the one or more aspects as described herein.

What is claimed is:

1. A server system, comprising:
    a first message controller associated with a first layer two (L2) of a first Radio Access Network (RAN) server; and
    memory storing instructions that, when executed by a processor, cause the first message controller to perform operations, comprising:
        intercepting, from the first L2 of the first RAN server, a first request directed to a first layer one (PHY) of the first RAN server, wherein the first request includes first information for performing signal processing of one or more first radio unit (RU) signals of a radio unit (RU);
        duplicating the first request, wherein duplicating the first request comprises removing the first information to form a first null request;
        routing the first request including the first information to the first PHY of the first RAN server, wherein the first PHY is active and performs the signal processing on the one or more first RU signals of the RU based on the first information; and
        routing the first null request not including the first information to a second layer one (PHY) of the second RAN server, wherein the second PHY is alive based on receiving the first null request, and wherein the second PHY is inactive based on the first null request not including the first information.

2. The server system of claim 1, wherein the RU is in communication with the first RAN server.

3. The server system of claim 1, wherein the duplicating the first request is in response to determining the second RAN server is capable of performing the signal processing on the one or more first RU signals of the RU.

4. The server system of claim 1, wherein the first null request is received by a second message controller associated with the second RAN server.

5. The server system of claim 1, the instructions when executed causing the first message controller to perform further operations, comprising:
    routing a first response from the first PHY of the first RAN server to the first L2 of the first RAN server; and
    discarding a second response from the second PHY of the second RAN server.

6. The server system of claim 1, the instructions when executed causing the first message controller to perform further operations, comprising:
    intercepting, from the first L2, a second request directed to the first PHY of the first RAN server, wherein the second request includes second information for performing signal processing on one or more second RU signals of the RU;
    determining the second RAN server should perform the signal processing on the one or more second RU signals of the RU;
    duplicating the second request, wherein duplicating the second request comprises removing the second information to form a second null request;
    routing the second request including the second information to the second PHY of the second RAN server, wherein the second PHY is changed to active and performs the signal processing on the one or more second RU signals of the RU based on the second information; and
    routing the second null request not including the second information to the first PHY of the first RAN server, wherein the first PHY is alive based on receiving the second null request, and wherein the first PHY is changed to inactive based on the second null request not including the second information.

7. The server system of claim 6, wherein the second request is routed to the second PHY of the second RAN server in response to a failure notification for the first PHY of the first RAN server.

8. The server system of claim 6, wherein the second request is routed to the second PHY of the second RAN server based on a planned maintenance schedule for the first PHY of the first RAN server.

9. A method of migrating signal processing from a first layer two (L2) of a first radio access network (RAN) server to a second layer one (PHY) of a second RAN server, comprising:
    intercepting, from the first L2 of the first RAN server, a request directed to a first PHY of the first RAN server, wherein the request includes instructions for performing signal processing of one or more radio unit (RU) signals of a radio unit (RU);
    determining the second RAN server should perform the signal processing on the one or more RU signals of the RU;
    duplicating the request, wherein duplicating the request comprises removing the instructions to form a null request;
    routing the request including the instructions to the second PHY of the second RAN server, wherein the second PHY is active and performs the signal processing on the one or more RU signals of the RU based on the instructions; and
    routing the null request not including the instructions to the first PHY of the first RAN server, wherein the first PHY is alive based on receiving the null request, and wherein the first PHY is inactive based on the null request not including the instructions.

10. The method of claim 9, wherein routing the request to the second PHY of the second RAN server comprises sending the request based on a network protocol over a network to a message controller associated with the second PHY of the second RAN server.

11. The method of claim 9, wherein the request is a femtocell application programming interface (FAPI) request in the form of a UL_CONFIG request, wherein the UL_CONFIG request specifies uplink user equipment (UE) transmissions from the RU, and wherein the instructions comprise at least the uplink UE transmissions.

12. The method of claim 11, wherein the null request is a FAPI request in the form of a null UL_CONFIG request, and wherein the null UL_CONFIG request does not specify the uplink UE transmissions.

13. The method of claim 9, wherein the request is routed to the second PHY of the second RAN server in response to a failure notification for the first PHY of the first RAN server.

14. The method of claim 9, wherein the request is routed to the second PHY of the second RAN server based on a planned maintenance schedule for the first PHY of the first RAN server.

15. The method of claim 9, wherein the RU is in communication with the first RAN server.

16. The method of claim 9, wherein the request is received by a message controller associated with the second RAN server.

17. A method of migrating signal processing from a first layer two (L2) of a first radio access network (RAN) server to a second layer one (PHY) of a second RAN server, comprising:

intercepting, from the first L2 of the first RAN server, a femtocell application programming interface (FAPI) request directed to a first PHY of the first RAN server, wherein the FAPI request includes information for performing signal processing on one or more radio unit (RU) signals of an RU;

determining the second RAN server should perform the signal processing on the one or more RU signals of the RU;

duplicating the FAPI request, wherein duplicating the FAPI request comprises removing the information to form a null FAPI request;

routing the FAPI request including the information to the second PHY of the second RAN server, wherein the second PHY is active and performs the signal processing on the one or more RU signals of the RU based on the information; and routing the null FAPI request not including the information to the first PHY of the first RAN server, wherein the first PHY is alive based on receiving the null FAPI request, and wherein the first PHY is inactive based on the null FAPI request not including the information.

18. The method of claim 17, wherein the FAPI request is a UL_CONFIG request, wherein the UL_CONFIG request specifies uplink user equipment (UE) transmissions from the RU, and wherein the information comprises at least the uplink UE transmissions.

19. The method of claim 18, wherein the null FAPI request is a null UL_CONFIG request, and wherein the null UL_CONFIG request does not specify the uplink UE transmissions.

20. The method of claim 17, wherein the FAPI request is automatically routed to the second PHY of the second RAN server in response to receiving a failure notification for the first PHY of the first RAN server.

* * * * *